United States Patent
Yasumura

(10) Patent No.: US 7,209,369 B1
(45) Date of Patent: Apr. 24, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/526,966

(22) Filed: Sep. 26, 2006

(30) Foreign Application Priority Data

Sep. 30, 2005 (JP) .......................... P2005-287759
Oct. 4, 2005 (JP) .......................... P2005-291082

(51) Int. Cl.
*H02M 3/335* (2006.01)
(52) U.S. Cl. .......................................... 363/16; 363/19
(58) Field of Classification Search ................. 363/16, 363/17, 19
See application file for complete search history.

(56) References Cited

U.S. PATENT DOCUMENTS

| | | | |
|---|---|---|---|
| 5,805,432 A * | 9/1998 | Zaitsu et al. .................. | 363/16 |
| 6,061,252 A * | 5/2000 | Hosotani ....................... | 363/16 |
| 7,054,167 B2 * | 5/2006 | Yasumura ..................... | 363/16 |
| 7,095,629 B2 * | 8/2006 | Yasumura ..................... | 363/16 |
| 7,145,785 B2 * | 12/2006 | Yasumura ..................... | 363/16 |

FOREIGN PATENT DOCUMENTS

JP     2000-134925 A     5/2000

* cited by examiner

*Primary Examiner*—Shawn Riley
(74) *Attorney, Agent, or Firm*—Lerner, David, Littenberg, Krumholz & Mentlik, LLP

(57) ABSTRACT

A switching power supply circuit includes a switching element, a converter transformer, a secondary-side rectifying and smoothing circuit, a switching element control unit, a choke coil, a primary-side series resonant circuit, a primary-side parallel resonant circuit, and a series circuit. The switching element implements switching for a direct-current (DC) voltage to convert the voltage into an alternating-current (AC) voltage. The choke coil is supplied with the voltage and is connected to one winding end of the primary winding and one terminal of the switching element. The primary-side series resonant circuit connects a primary-side series resonant capacitor, having a resonant frequency dominated by a leakage inductance. The primary-side parallel resonant circuit connects a primary-side parallel resonant capacitor in parallel to the switching element, having a resonant frequency. The series circuit is formed of a clamp capacitor and an auxiliary switch element which conducts in a non-conducting period of the switching element.

9 Claims, 16 Drawing Sheets

FIG.18A   FIG.18B   FIG.18C

SWITCHING POWER SUPPLY CIRCUIT

CROSS REFERENCES TO RELATED APPLICATIONS

The present invention contains subject matter related to Japanese Patent Application JP 2005-287759 filed with the Japanese Patent Office on Sep. 30, 2005 and Japanese Patent Application JP 2005-291082 filed with the Japanese Patent Office on Oct. 4, 2005, the entire contents of which being incorporated herein by reference.

BACKGROUND OF THE INVENTION

1. Field of the Invention

The present invention relates to a switching power supply circuit.

2. Description of the Related Art

As types of a so-called soft switching power supply that employs a resonant converter, a current resonant type and a voltage resonant type have been widely known. Currently, half-bridge current resonant converters formed of a two-transistor switching element have been widely employed since they can easily be put into practical use.

However, since characteristics of high-breakdown-voltage switching elements are currently being improved for example, problems about breakdown voltage associated with putting voltage resonant converters into practical use are being cleared up. Furthermore, it is known that a single-ended voltage resonant converter formed of a one-transistor switching element is advantageous over a one-transistor current resonant forward converter in terms of input feedback noise and noise components of a DC output voltage line.

FIG. 16 illustrates one configuration example of a switching power supply circuit including a single-ended voltage resonant converter. This voltage resonant converter is combined with a series resonant circuit on the secondary side to be described later, formed of a leakage inductor L2 of a secondary winding and a secondary-side series resonant capacitor C2, and hence is referred to as a multiple resonant converter.

In the switching power supply circuit of FIG. 16, a voltage from a commercial alternating-current power supply AC is rectified and smoothed by a rectifying and smoothing circuit formed of a bridge rectifier circuit Di and a smoothing capacitor Ci, to thereby produce a DC input voltage Ei as the voltage across the smoothing capacitor Ci. The lines from the commercial power supply AC are provided with a noise filter that includes a pair of common mode choke coils CMC and two across-line capacitors CL, and removes common mode noise.

The DC input voltage Ei is input to the voltage resonant converter as a DC input voltage. The voltage resonant converter has a single-ended configuration including a one-transistor switching element Q1 as described above. The voltage resonant converter in this circuit is separately excited. Specifically, the switching element Q1 formed of a MOSFET is switch-driven by an oscillation and drive circuit 2.

A body diode DD1 of the MOSFET is connected in parallel to the switching element Q1. In addition, a primary-side parallel resonant capacitor Cr is connected in parallel to the channel between the drain and source of the switching element Q1. The primary-side parallel resonant capacitor Cr and a leakage inductor L1 of a primary winding N1 in an isolation converter transformer PIT form a primary-side parallel resonant circuit (voltage resonant circuit). This primary-side parallel resonant circuit offers voltage resonant operation as the switching operation of the switching element Q1.

In order to switch-drive the switching element Q1, the oscillation and drive circuit 2 applies a gate voltage as a drive signal to the gate of the switching element Q1. Thus, the switching element Q1 implements switching operation with the switching frequency dependent upon the cycle of the drive signal.

The isolation converter transformer PIT transmits the switching output from the switching element Q1 to the secondary side. As shown in FIG. 17, the isolation converter transformer PIT is constructed of an EE-shaped core formed by combining E-shaped cores CR1 and CR2 composed of a ferrite material for example. Furthermore, the primary winding N1 and a secondary winding N2 are wound on a bobbin B that covers the center magnetic leg of the EE-shaped core, with the winding part being divided into the primary side and secondary side. In addition, a gap G with a length of about 0.8 to 1.0 mm is provided in the center leg of the EE-shaped core in the isolation converter transformer PIT, so that a coupling coefficient k of about 0.80 to 0.85 is obtained between the primary and secondary sides. When the coupling coefficient k has such a value, the coupling degree between the primary and secondary sides may be regarded as loose coupling, and thus it is correspondingly difficult to obtain the saturation state. The value of the coupling coefficient k is a factor in defining the leakage inductance (inductance of the leakage inductor L1).

The primary winding N1 in the isolation converter transformer PIT is interposed between the switching element Q1 and the positive electrode of the smoothing capacitor Ci, which allows the transmission of the switching output from the switching element Q1. In the secondary winding N2 of the isolation converter transformer PIT, an alternating voltage induced by the primary winding N1 is generated.

On the secondary side, the secondary-side series resonant capacitor C2 is connected in series to one end of the secondary winding N2, and therefore the leakage inductor L2 of the secondary winding N2 and the capacitance of the secondary-side series resonant capacitor C2 form a secondary-side series resonant circuit (current resonant circuit).

Furthermore, rectifier diodes Do1 and Do2 and a smoothing capacitor Co are connected to this secondary-side series resonant circuit as shown in the drawing, so that a voltage-doubler half-wave rectifier circuit is formed. This voltage-doubler half-wave rectifier circuit produces, as the voltage across the smoothing capacitor Co, a DC output voltage Eo with the level twice that of a secondary winding voltage V3 induced in the secondary winding N2. The DC output voltage Eo is supplied to a load, and is input to a control circuit 1 as a detected voltage for constant-voltage control.

The control circuit 1 detects the level of the DC output voltage Eo input as a detected voltage, and then inputs the obtained detection output to the oscillation and drive circuit 2. The oscillation and drive circuit 2 outputs a drive signal of which frequency and so on are varied depending on the level of the DC output voltage Eo indicated by the detection output, to thereby control the switching operation of the switching element Q1 so that the DC output voltage Eo is kept constant at a predetermined level. Thus, stabilization control of the DC output voltage Eo is achieved.

FIGS. 18A to 18C and 19 show experimental results on the power supply circuit with the configuration shown in FIG. 16. For the experiments, major parts in the power supply circuit of FIG. 16 were designed to have the following parameters.

EER-35 was chosen as the core of the isolation converter transformer PIT, and a gap in the center leg thereof was designed to have a gap length of 1 mm. The numbers of turns of the primary winding N1 and the secondary winding N2 were set to 39 T and 23 T, respectively. The induction voltage level per one turn (T) in the secondary winding N2 was set to 3 V/T. The coupling coefficient k of the isolation converter transformer PIT was set to 0.81.

The capacitance of the primary-side parallel resonant capacitor Cr was set to 3900 pF (picofarad). The capacitance of the secondary-side series resonant capacitor C2 was set to 0.1 μF (microfarad). Accordingly, the primary-side parallel resonant frequency fo1 of the primary-side parallel resonant circuit was set to 230 kHz (kilohertz), and the secondary-side series resonant frequency fo2 of the secondary-side series resonant circuit was set to 82 kHz. Therefore, the relative relationship between the primary-side parallel resonant frequency fo1 and the secondary-side series resonant frequency fo2 can be represented as fo1≈2.8×fo2.

The rated level of the DC output voltage Eo was 135 V. The allowable load power range was from the maximum load power Pomax of 200 W to the minimum load power Pomin of 0 W.

FIGS. 18A to 18C are waveform diagrams showing the operation of the major parts in the power supply circuit shown in FIG. 16, with reflecting the corresponding switching cycle of the switching element Q1. FIG. 18A shows a switching voltage V1 applied to the switching element Q1, a switching current IQ1, a primary winding current I2, a secondary winding current I3, and rectified currents ID1 and ID2, when the load power is the maximum load power Pomax of 200 W. FIG. 18B shows the switching voltage V1, the switching current IQ1, the primary winding current I2, and the secondary winding current I3, when the load power is intermediate load power Po of 120 W. FIG. 18C shows the switching voltage V1 and the switching current IQ1 when the load power is the minimum load power Pomin of 0 W.

The switching voltage V1 is the voltage obtained across the switching element Q1, and has a waveform like ones illustrated in FIGS. 18A to 18C. Specifically, the voltage level is at the zero level during periods TON that are the periods when the switching element Q1 is in the ON-state, while a sinusoidal resonant pulse is obtained during periods TOFF that are the periods when it is in the OFF-state. This resonant pulse waveform of the switching voltage V1 indicates that the operation of the primary-side switching converter is voltage resonant operation.

The switching current IQ1 is the current flowing through the switching element Q1 (and the body diode DD1). The switching current IQ1 flows with the illustrated waveform during the period TON, while it is at the zero level during the period TOFF.

The primary winding current I2 flowing through the primary winding N1 is the current resulting from the synthesis between the current flowing as the switching current IQ1 during the period TON and the current flowing to the primary-side parallel resonant capacitor Cr during the period TOFF. The rectified currents ID1 and ID2, shown only in FIG. 18A, flowing through the rectifier diodes Do1 and Do2 as the operation of the secondary-side rectifier circuit have sinusoidal waveforms like the illustrated ones. In the waveform diagrams, the waveform of the rectified current ID1 indicates the resonant operation of the secondary-side series resonant circuit more dominantly than the waveform of the rectified current ID2.

The secondary winding current I3 flowing through the secondary winding N2 has a waveform resulting from the synthesis between the waveforms of the rectified currents ID1 and ID2. FIG. 19 shows, as functions of the load, the switching frequency fs, the lengths of the periods TON and TOFF of the switching element Q1, and the AC to DC power conversion efficiency (ηAC→DC), regarding the power supply circuit shown in FIG. 16.

Referring initially to the AC to DC power conversion efficiency (ηAC→DC), it is apparent that high efficiency of 90% or more is achieved in a wide range of the load power Po from 50 W to 200 W. The inventor of the present application has previously confirmed, based on experiments, that such a characteristic is obtained when a single-ended voltage resonant converter is combined with a secondary-side series resonant circuit.

In addition, the switching frequency fs, the period TON, and the period TOFF in FIG. 19 indicate the switching operation of the power supply circuit in FIG. 16 as the characteristic of constant-voltage control against load variation. In this power supply circuit, the switching frequency fs is almost constant against the load variation. In contrast, the periods TON and TOFF show linear changes with opposite tendencies as shown in FIG. 19. This indicates that control of the switching operation against the variation of the DC output voltage Eo is implemented in such a manner that the time ratio between the ON and OFF periods is changed with the switching frequency (switching cycle) being kept almost constant. Such control can be regarded as pulse width modulation (PWM) control, in which the lengths of the ON and OFF periods within one switching cycle are changed. That is, the power supply circuit in FIG. 16 uses the PWM control for stabilization of the DC output voltage Eo.

FIG. 20 schematically shows the constant-voltage control characteristic of the power supply circuit shown in FIG. 16, based on the relationship between the switching frequency fs (kHz) and the DC output voltage Eo.

The power supply circuit shown in FIG. 16 includes a primary-side parallel resonant circuit and a secondary-side series resonant circuit, and therefore has two resonant impedance characteristics in a complex manner: the resonant impedance characteristic corresponding to the primary-side parallel resonant frequency fo1 of the primary-side parallel resonant circuit, and that corresponding to the secondary-side series resonant frequency fo2 of the secondary-side series resonant circuit. Since the power supply circuit in FIG. 16 has the frequency relationship fo1≈2.8×fo2, the secondary-side series resonant frequency fo2 is lower than the primary-side parallel resonant frequency fo1 also as shown in FIG. 20.

The characteristic curves in FIG. 20 show a constant-voltage control characteristic that depends on control of the switching frequency fs and is assumed based on these resonant frequencies and the condition of a certain constant input AC voltage VAC. Specifically, Characteristic curves A and B correspond to the maximum load power Pomax and the minimum load power Pomin, respectively, and indicate the constant-voltage control characteristic in relation to the resonant impedance corresponding to the primary-side parallel resonant frequency fo1 of the primary-side parallel resonant circuit. Characteristic curves C and D correspond to the maximum load power Pomax and the minimum load power Pomin, respectively, and indicate the constant-voltage control characteristic in relation to the resonant impedance corresponding to the secondary-side series resonant frequency fo2 of the secondary-side series resonant circuit. When, under the characteristic shown in FIG. 20, constant-voltage control is intended so that the output voltage is kept at the voltage tg that is the rated level of the DC output voltage Eo, the variation range of the switching frequency fs necessary for the constant-voltage control (requisite control range) can be expressed by the section indicated as Δfs.

The control range Δfs shown in FIG. 20 is from the frequency offering the voltage level tg on Characteristic curve C, corresponding to the secondary-side series resonant frequency fo2 of the secondary-side series resonant circuit and the maximum load power Pomax, to that on Characteristic curve B, corresponding to the primary-side parallel resonant frequency fo1 of the primary-side parallel resonant circuit and the minimum load power Pomin. The range Δfs intersects with Characteristic curve D, which corresponds to the secondary-side series resonant frequency fo2 of the secondary-side series resonant circuit and the minimum load power Pomin, and with Characteristic curve A, which corresponds to the primary-side parallel resonant frequency fo1 of the primary-side parallel resonant circuit and the maximum load power Pomax.

Therefore, as constant-voltage control operation, the power supply circuit in FIG. 16 implements switching drive control based on PWM control in which the time ratio in one switching cycle (ratio between the periods TON and TOFF) is changed with the switching frequency fs being kept almost constant. The implementation of the PWM control is indicated also by FIGS. 18A to 18C, in which the widths of the periods TOFF and TON change depending on the load power while the length of one switching cycle (TOFF+TON) at a time of Pomax=200 W and Po=120 W is almost constant irrespective of the load power.

This operation is due to such a resonant impedance characteristic of the power supply circuit against load variation that transition is implemented, in the narrow switching frequency range Δfs, between the state where the resonant impedance corresponding to the primary-side parallel resonant frequency fo1 of the primary-side parallel resonant circuit (capacitive impedance) is dominant, and the state where the resonant impedance corresponding to the secondary-side series resonant frequency fo2 of the secondary-side series resonant circuit (inductive impedance) is dominant.

The related art of the invention is disclosed in e.g. Japanese Patent Laid-open No. 2000-134925.

SUMMARY OF THE INVENTION

The power supply circuit in FIG. 16 involves the following problem.

Turning back to the aforedescribed waveform diagrams of FIGS. 18A to 18C, the switching current IQ1 when the load power is the maximum load power Pomax, shown in FIG. 18A, behaves as follows. Specifically, the switching current IQ1 is at the zero level until the end of the period TOFF, which is the turn-ON timing of the switching element Q1. When the period TON starts, initially a current of the negative polarity flows through the body diode DD1, and then the polarity is inverted so that the switching current IQ1 flows between the drain and source of the switching element Q1. This operation indicates the state where zero voltage switching (ZVS) is adequately carried out.

In contrast, the switching current IQ1 when the load power is intermediate load power Po of 120 W, shown in FIG. 18B, shows a waveform in which a noise current flows at timing immediately before the end of the period TOFF, which is the turn-ON timing of the switching element Q1. This waveform indicates abnormal operation in which ZVS is not implemented adequately.

That is, it is known that a voltage resonant converter including a secondary-side series resonant circuit as shown in FIG. 16 involves abnormal operation in which ZVS is not implemented adequately when the load is an intermediate load. It has been confirmed that, in an actual power supply circuit of FIG. 16, such abnormal operation arises in the load variation range indicated by the section A in FIG. 19 for example.

A voltage resonant converter including a secondary-side series resonant circuit originally has a tendency to have a characteristic of keeping high efficiency favorably against load variation as described above. However, as shown with the switching current IQ1 of FIG. 18B, a corresponding peak current flows at the turn-ON timing of the switching element Q1. This noise current causes an increase of switching loss, which is a factor in a decrease of the power conversion efficiency.

In addition, the occurrence of such abnormal operation anyway yields an offset of the phase-gain characteristic of the constant-voltage control circuitry for example, which leads to switching operation in an abnormal oscillation state. Therefore, currently there is a strong recognition that it is difficult to put the voltage resonant converter into practical use in actual.

In consideration of the above-described problem, an embodiment of the present invention provides a switching power supply circuit having the following configuration. Specifically, the switching power supply circuit includes a switching element, a converter transformer, and a secondary-side rectifying and smoothing circuit. The switching element implements switching for a DC voltage to thereby convert the DC voltage into an AC voltage. The converter transformer inputs the AC voltage to a primary winding so that an AC voltage is generated in a secondary winding. The secondary-side rectifying and smoothing circuit includes a secondary-side rectifier element and a secondary-side smoothing capacitor for rectifying and smoothing the AC voltage generated in the secondary winding to thereby produce an output DC voltage, and a switching element control unit that controls the switching element based on the output DC voltage. The switching power supply circuit also includes a choke coil that is supplied with the DC voltage through one end thereof, and is connected via the other end thereof to one winding end of the primary winding in the converter transformer and one terminal of the switching element. The switching power supply circuit also includes a primary-side series resonant circuit that is formed by connecting a primary-side series resonant capacitor between the other winding end of the primary winding in the converter transformer and the other terminal of the switching element, and has a resonant frequency dominated by a leakage inductance arising in the primary winding in the converter transformer and the primary-side series resonant capacitor. The switching power supply circuit further includes a primary-side parallel resonant circuit that is formed by connecting a primary-side parallel resonant capacitor in parallel to the switching element, and has a resonant frequency dominated by the leakage inductance arising in the primary winding and the primary-side parallel resonant capacitor. The switching power supply circuit further includes a series circuit that is formed of a clamp capacitor and an auxiliary switch element, and is connected in parallel to the choke coil. The auxiliary switch element conducts when the switching element is in the non-conducting state.

The switching power supply circuit based on the above-described configuration includes a switching element, a converter transformer, a secondary-side rectifying and smoothing circuit, and a switching element control unit. The switching element implements switching for a DC voltage to thereby convert the DC voltage into an AC voltage. The converter transformer inputs the AC voltage to a primary winding so that an AC voltage is generated in a secondary winding. The secondary-side rectifying and smoothing circuit includes a secondary-side rectifier element and a secondary-side smoothing capacitor for rectifying and smoothing the AC voltage generated in the secondary winding to thereby produce an output DC voltage. The switching element control unit controls the switching element based on the output DC voltage. Therefore, in this switching power supply circuit, AC power is converted into DC power, and then the DC power is converted into AC power through the switching element controlled by the switching element control unit, so that a predetermined voltage can be obtained on the secondary side through the converter transformer.

Furthermore, power is supplied via the choke coil to one winding end of the primary winding in the converter transformer and one terminal of the switching element. Thus, the current supplied from the choke coil is a ripple current close to a DC current. In addition, by connecting the series resonant capacitor between the other winding end of the primary winding in the converter transformer and the other terminal of the switching element, the series resonant circuit of which resonant frequency is dominated by the leakage inductance arising in the primary winding in the converter transformer and the series resonant capacitor is formed. Moreover, the parallel resonant circuit of which resonant frequency is dominated by the primary-side parallel resonant capacitor connected in parallel to the switching element and the leakage inductance arising in the primary winding is formed. The formation of these resonant circuits can narrow the variable range of the switching frequency of the switching element.

Furthermore, the switching power supply circuit includes the series circuit of the clamp capacitor and the auxiliary switch element, connected in parallel to the choke coil. The auxiliary switch element conducts when the switching element is in the non-conducting state, and hence a voltage applied to the switching element can be clamped.

According to the embodiment of the present invention, abnormal operation in which zero voltage switching (ZVS) operation is not achieved in an intermediate load condition range is eliminated from a switching power supply circuit including a parallel resonant circuit on its primary side.

In addition, a ripple current close to a DC current is obtained as the current flowing into the switching converter from the smoothing capacitor in the rectifying and smoothing circuit that produces the rectified and smoothed voltage (DC input voltage) from an AC power supply. Therefore, a small value can be assigned to the capacitance of the component element as the smoothing capacitor and the choice of a general-purpose product as the smoothing capacitor is allowed, which offers e.g. an advantage of reducing costs and size of the smoothing capacitor.

Moreover, as described above, reduction of power loss is achieved due to a decrease of the amount of the current flowing in the power supply circuit, and thus the total power conversion efficiency characteristic is greatly improved. Furthermore, a switching element of which breakdown voltage is low can be used.

BRIEF DESCRIPTION OF THE DRAWINGS

FIGS. 18A to 18C are waveform diagrams showing the operation of major parts in the power supply circuit shown as the background art;

DETAILED DESCRIPTION OF THE PREFERRED EMBODIMENTS

Before explaining best modes (embodiments, hereinafter) for carrying out the present invention, the basic configuration of a switching converter that implements class-E resonant switching operation (referred to also as a class-E switching converter, hereinafter) as a background art of the embodiments will be described below with reference to FIGS. 1 and 2.

Figure 1:
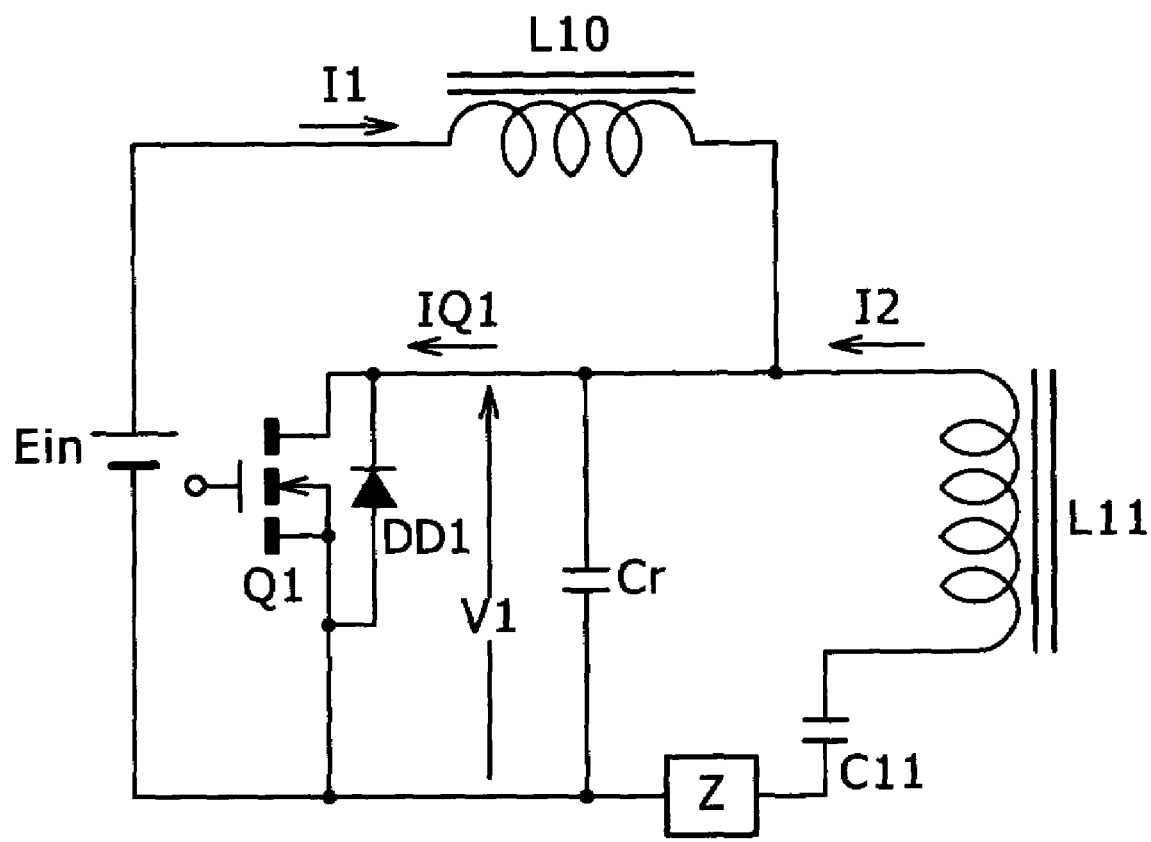
FIG. 1 is a circuit diagram illustrating a basic configuration example of a class-E switching converter.

FIG. 1 illustrates the basic configuration of a class-E switching converter. The class-E switching converter in this drawing has a configuration as a DC-AC inverter that operates in a class-E resonant mode.

This class-E switching converter includes a one-transistor switching element Q1. The switching element Q1 is a MOSFET in this converter. A body diode DD1 is connected in parallel to the channel between the drain and source of the MOSFET switching element Q1. The forward direction of the body diode DD1 is from the source to the drain of the switching element Q1.

In addition, a primary-side parallel resonant capacitor Cr is connected in parallel to the channel between the drain and source of the switching element Q1. The drain of the switching element Q1 is connected in series to a choke coil L10, and is coupled via the choke coil L10 to the positive electrode of a DC power supply Ein. The source of the switching element Q1 is connected to the negative electrode of the DC power supply Ein. The drain of the switching element Q1 is connected to one end of a choke coil L11. The other end of the choke coil L11 is connected in series to a primary-side series resonant capacitor C11. An impedance Z as a load is interposed between the primary-side series resonant capacitor C11 and the negative electrode of the DC power supply Ein. Specific examples of the impedance z include a piezoelectric transformer and a high-frequency-compatible fluorescent lamp.

The class-E switching converter with this configuration can be regarded as one form of a complex resonant converter that includes a parallel resonant circuit formed of the inductance of the choke coil L10 and the capacitance of the primary-side parallel resonant capacitor Cr, and a series resonant circuit formed of the inductance of the choke coil L11 and the capacitance of the primary-side series resonant capacitor C11. In addition, since the class-E switching converter includes one switching element, it can be regarded as equivalent to a single-ended voltage resonant converter.

Figure 2:
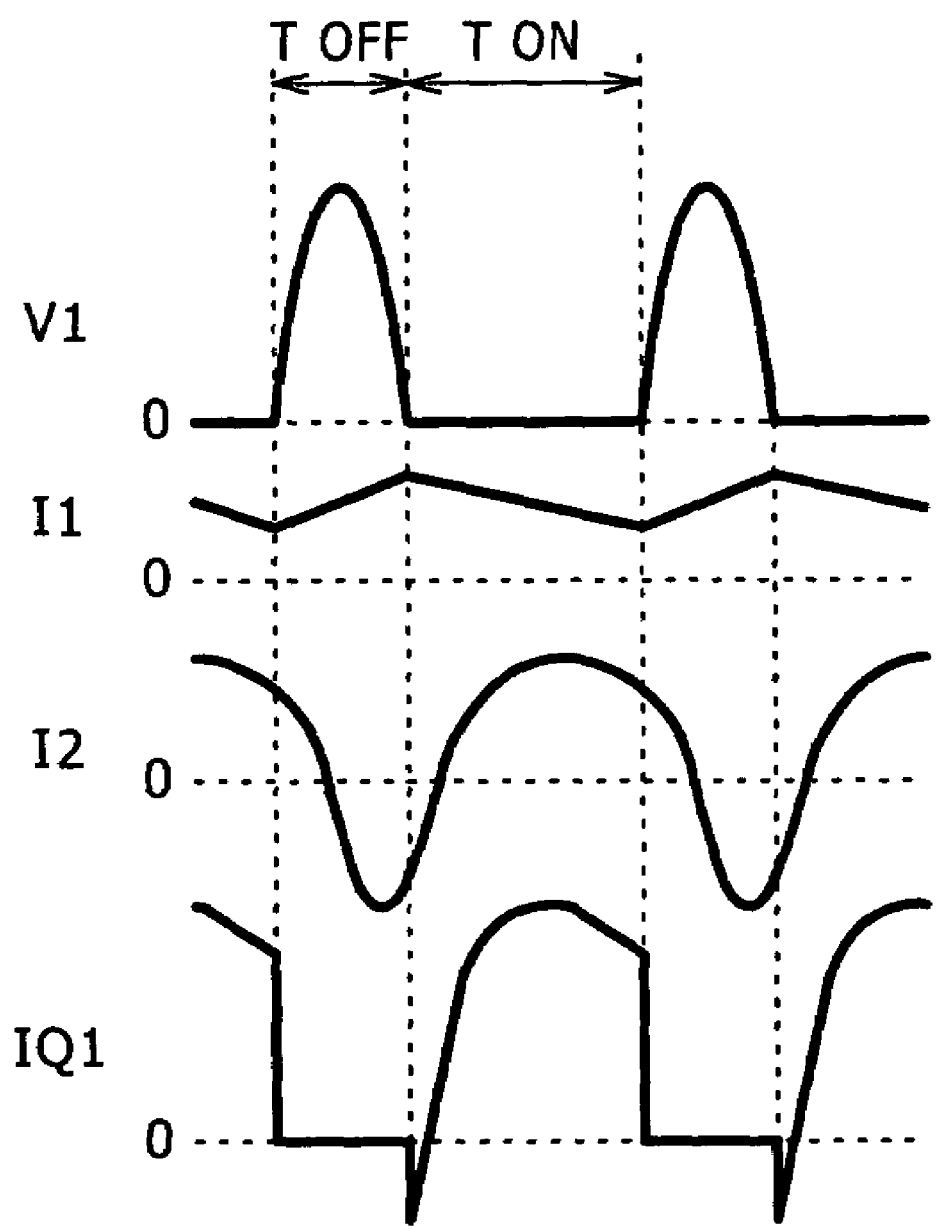
FIG. 2 is a waveform diagram showing the operation of the class-E switching converter.

FIG. 2 shows the operation of major parts in the class-E switching converter shown in FIG. 1.

A switching voltage V1 is the voltage obtained across the switching element Q1, and has a waveform like that in FIG. 2. Specifically, the voltage level is at the zero level during the period TON when the switching element Q1 is in the ON-state, while a sinusoidal pulse is obtained during the period TOFF when it is in the OFF-state. This switching pulse waveform is due to the resonant operation (voltage resonant operation) of the above-described parallel resonant circuit.

A switching current IQ1 is the current flowing through the switching element Q1 (and the body diode DD1). During the period TOFF, the switching current IQ1 is at the zero level. During the period TON, the switching current IQ1 has a waveform like the illustrated one. Specifically, during a certain period from the start of the period TON, the switching current IQ1 initially flows through the body diode DD1, and thus has the negative polarity. Subsequently, the polarity of the current is inverted to the positive polarity, so that the switching current IQ1 flows from the drain to the source of the switching element Q1. A current I2 flowing through the series resonant circuit as an output of the class-E switching converter results from the synthesis between the switching current IQ1 flowing through the switching element Q1 (and the body diode DD1) and the current flowing to the primary-side parallel resonant capacitor Cr, and has a waveform including sinusoidal wave components. The waveforms of the switching current IQ1 and the switching voltage V1 indicate that ZVS operation is achieved at the turn-OFF timing of the switching element Q1, and ZVS and ZCS operations are achieved at the turn-ON timing thereof.

An input current I1 flowing from the positive electrode of the DC power supply Ein through the choke coil L10 to the class-E switching converter has a ripple waveform with a certain average current level like the illustrated one, since the inductance of the choke coil L10 is set larger than that of the choke coil L11. This ripple current can be regarded as a DC current approximately.

Figure 3:
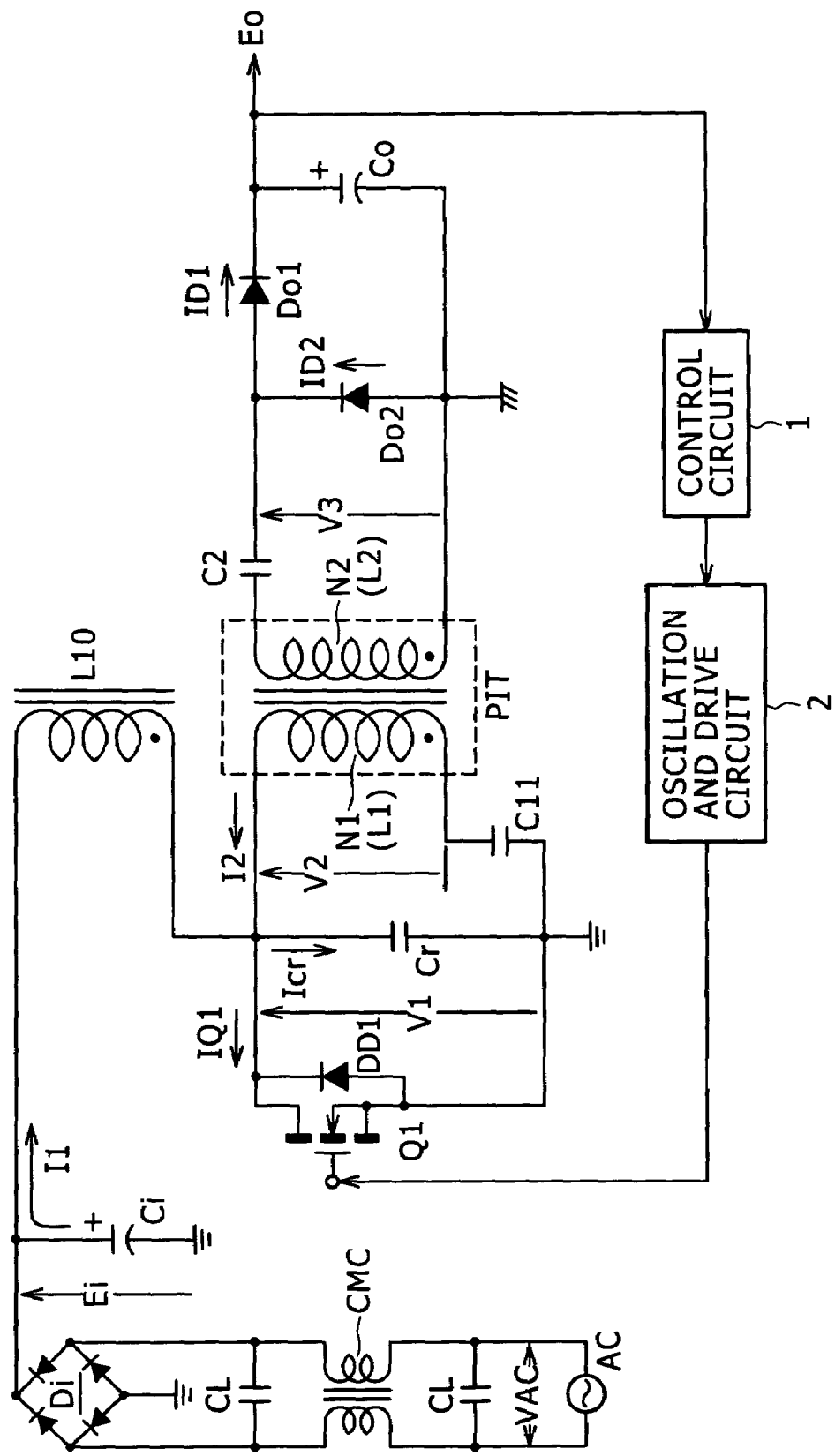
FIG. 3 is a circuit diagram illustrating a configuration example of a switching power supply circuit to which a class-E switching converter is applied.

The inventor of the present application has constructed a power supply circuit with applying a class-E switching converter based on the above-described basic configuration, and has performed experiments on the power supply circuit. FIG. 3 is a circuit diagram showing a configuration example of this power supply circuit.

In the switching power supply circuit in FIG. 3, the lines from a commercial alternating-current power supply AC are provided with a pair of common mode choke coils CMC and two across-line capacitors CL. The common mode choke coils CMC and the across-line capacitors CL form a noise filter that removes common mode noise superimposed on the lines from the commercial power supply AC.

AC power from the commercial power supply AC is rectified by a bridge rectifier circuit Di, and the rectified output is charged in a smoothing capacitor Ci. That is, the AC power is rectified and smoothed by a rectifying and smoothing circuit formed of the bridge rectifier circuit Di and the smoothing capacitor Ci, so as to be converted into DC power. Thus, a DC input voltage Ei is obtained as the voltage across the smoothing capacitor Ci. The DC input voltage Ei serves as a DC input voltage for the switching converter at the subsequent stage.

In the power supply circuit of FIG. 3, the switching converter that is fed with the DC input voltage Ei as a DC input voltage and implements switching operation is formed as a class-E switching converter based on the basic configuration of FIG. 1. In this circuit, a high-breakdown-voltage MOSFET is chosen as the switching element Q1. In addition, the class-E switching converter in this circuit is separately excited. Specifically, an oscillation and drive circuit 2 switch-drives the switching element.

The drain of the switching element Q1 is connected in series to a choke coil L10, and is coupled via the choke coil L10 to the positive electrode of the smoothing capacitor Ci. Therefore, in this circuit, the DC input voltage Ei is supplied via the serially connected choke coil L10 to the drain of the switching element Q1 and one winding end of a primary winding N1 in an isolation converter transformer PIT. The source of the switching element Q1 is coupled to the primary-side ground. An inductor L10 formed by a choke coil winding N10 serves as a functional component equivalent to the choke coil L10 in the class-E switching converter shown in FIG. 1.

Applied to the gate of the switching element Q1 is a switching drive signal (voltage) output from the oscillation and drive circuit 2. Since a MOSFET is chosen as the switching element Q1, the switching element Q1 incorporates a body diode DD1 so that the diode DD1 is connected in parallel to the channel between the source and drain of the switching element Q1 as shown in the drawing. The anode of the body diode DD1 is connected to the source of the switching element Q1, and the cathode thereof is connected to the drain of the switching element Q1. The body diode DD1 forms a path for allowing the passage therethrough of the switching current in the opposite direction arising due to the ON/OFF operation of the switching element Q1 (switching operation of alternately repeating ON and OFF, which indicate the conducting state and non-conducting state, respectively).

In addition, a primary-side parallel resonant capacitor Cr is connected in parallel to the channel between the drain and source of the switching element Q1. The capacitance of the primary-side parallel resonant capacitor Cr and the leakage inductance of the leakage inductor L1 formed by the primary winding N1 in the isolation converter transformer PIT form a primary-side parallel resonant circuit (voltage resonant circuit) for a switching current flowing through the switching element Q1. In this power supply circuit, the influence of the choke coil L10 is not taken into consideration for this primary-side parallel resonant circuit, based on an assumption that the inductance of the choke coil L10 is higher than that of the leakage inductor L1. However, the contribution of the choke coil L10 to the primary-side parallel resonant circuit also needs to be considered if the resonant frequency of the resonant circuit formed of the choke coil L10, the smoothing capacitor Ci, and the primary-side parallel resonant capacitor Cr is close to that of the resonant circuit formed of the primary-side parallel resonant capacitor Cr and the leakage inductor L1 due to any of the following conditions: the inductance of the choke coil L10 is close to that of the leakage inductor L1; the capacitance of a primary-side series resonant capacitor C11 to be described later is close to that of the primary-side parallel resonant capacitor Cr; the capacitance of the smoothing capacitor Ci is close to that of the primary-side parallel resonant capacitor Cr; and so on. The resonant operation of this primary-side parallel resonant circuit offers voltage resonant operation as one switching operation of the switching element Q1. Due to this operation, during the OFF period of the switching element Q1, a switching voltage V1 that is the voltage between the drain and source of the switching element Q1 has a sinusoidal resonant pulse waveform.

In addition, connected in parallel to the channel between the drain and source of the switching element Q1 is a series circuit formed of the primary winding N1 in the isolation converter transformer PIT to be described later and the primary-side series resonant capacitor C11. Specifically, one winding end (e.g. the winding-finish end) of the primary winding N1 is connected to the drain of the switching element Q1, while the other winding end (e.g. the winding-start end) thereof is connected to one electrode of the primary-side series resonant capacitor C11. The other electrode of the primary-side series resonant capacitor C11, not coupled to the primary winding N1, is connected to the source of the switching element Q1 at the primary-side ground potential.

In order to drive the switching element Q1 by separate excitation for example, the oscillation and drive circuit 2 produces a drive signal that is a gate voltage for switch-driving the MOSFET based on an oscillation circuit and an oscillation signal obtained due to the oscillation circuit, and applies the drive signal to the gate of the switching element Q1. Thus, the switching element Q1 continuously implements ON/OFF operation according to the waveform of the drive signal. That is, the switching element Q1 implements switching operation.

The isolation converter transformer PIT transmits the switching output from the primary-side switching converter to the secondary side, with isolating the primary side from the secondary side in terms of DC transmission therebetween. For this transmission, the primary winding N1 and a secondary winding N2 are wound around the isolation converter transformer PIT.

The isolation converter transformer PIT in this circuit includes an EE-shaped core formed by combining E-cores composed of a ferrite material as one example. Furthermore, as windings, the primary winding N1 and the secondary winding N2 are wound around the center magnetic leg of the EE-shaped core, with the winding part being divided into the primary side and secondary side.

In addition, a gap with a length of about 1.6 mm is provided in the center leg of the EE-shaped core in the isolation converter transformer PIT, so that a coupling coefficient k of about 0.75 is obtained between the primary side and the secondary side. This value of the coupling coefficient k is generally such a value that the coupling degree between the primary and secondary sides is regarded as loose coupling and hence it is correspondingly difficult for the isolation converter transformer PIT to enter the saturation state.

The primary winding N1 in the isolation converter transformer PIT is an element for forming the primary-side series resonant circuit in the class-E switching converter formed on the primary side, as described later. An alternating output dependent upon the switching output of the switching element Q1 is obtained in the primary winding N1.

On the secondary side of the isolation converter transformer PIT, an alternating voltage induced by the primary winding N1 is generated in the secondary winding N2. A secondary-side series resonant capacitor C2 is connected in series to the secondary winding N2. Thus, a leakage inductor L2 of the secondary winding N2 and the capacitance of the secondary-side series resonant capacitor C2 form a secondary-side series resonant circuit. This secondary-side series resonant circuit implements resonant operation in association with the rectifying operation of a secondary-side rectifier circuit to be described later. Thus, a secondary winding current flowing through the secondary winding N2 has a sinusoidal waveform. That is, current resonant operation is achieved on the secondary side.

The secondary-side rectifier circuit in this power supply circuit is formed as a voltage-doubler half-wave rectifier circuit by coupling two rectifier diodes Do1 and Do2 and one smoothing capacitor Co to the secondary winding N2, to which the secondary-side series resonant capacitor C2 is connected in series as described above. The connecting structure of the voltage-doubler half-wave rectifier circuit is as follows. The winding-finish end of the secondary winding N2 is coupled via the secondary-side series resonant capacitor C2 to the anode of the rectifier diode Do1 and the cathode of the rectifier diode Do2. The cathode of the rectifier diode Do1 is connected to the positive electrode of the smoothing capacitor Co. The winding-start end of the secondary winding N2 and the anode of the rectifier diode Do2 are connected to the negative electrode of the smoothing capacitor Co at the secondary-side ground potential.

The rectifying operation of the thus formed voltage-doubler half-wave rectifier circuit is as follows. In the periods of half cycles corresponding to one polarity of the voltage across the secondary winding N2 (secondary winding voltage), which is an alternating voltage induced in the secondary winding N2, a forward voltage is applied to the rectifier diode Do2, and thus the rectifier diode Do2 conducts. Therefore, the rectified current is charged in the secondary-side series resonant capacitor C2. Thus, generated across the secondary-side series resonant capacitor C2 is the voltage with the same level as that of the alternating voltage induced in the secondary winding N2. In the periods of half cycles corresponding to the other polarity of the secondary winding voltage V3, the rectifier diode Do1 is provided with a forward voltage and thus conducts. At this time, the smoothing capacitor Co is charged by the potential resulting from superposition of the secondary winding voltage V3 and the voltage across the secondary-side series resonant capacitor C2.

Thus, generated across the smoothing capacitor Co is the DC output voltage Eo having the level equal to twice the level of the alternating voltage excited in the secondary winding N2. In this rectifying operation, the charging of the smoothing capacitor Co is implemented only in the periods of half cycles of one polarity of the alternating voltage excited in the secondary winding N2. That is, rectifying operation as voltage-doubling half-wave rectifying is achieved. Furthermore, this rectifying operation can be regarded as operation for the resonance output of the secondary-side series resonant circuit formed by the series connection of the secondary winding N2 to the secondary-side series resonant capacitor C2. The thus produced DC output voltage Eo is supplied to a load. In addition, the voltage Eo is branched and output to a control circuit 1 as a detected voltage.

The control circuit 1 supplies to the oscillation and drive circuit 2 a detection output dependent upon a level change of the input DC output voltage Eo. The oscillation and drive circuit 2 drives the switching element Q1, with varying the switching frequency, and along with this, varying the time ratio between the periods TON and TOFF (conduction angle) within one switching cycle according to the detection output input from the control circuit 1. This operation serves as constant-voltage control operation for the secondary-side DC output voltage.

This variation control of switching frequency and conduction angle of the switching element Q1 leads to changes of resonant impedances of the primary and secondary sides and the power transmission effective period, in the power supply circuit. These changes result in a change of the amount of power transmitted from the primary winding N1 to the secondary winding N2 in the isolation converter transformer PIT, and in a change of the amount of power that should be supplied from the secondary-side rectifier circuit to a load. Thus, the level of the DC output voltage Eo is controlled so that the level variation thereof is cancelled. That is, stabilization of the DC output voltage Eo is allowed.

When the switching converter (Q1, Cr, L10, N1 and C11) formed on the primary side of the thus formed power supply circuit of FIG. 3 is compared with the aforedescribed class-E converter shown in FIG. 1, the switching converter of FIG. 3 can be regarded as circuitry obtained by removing the impedance Z as a load from the circuit of FIG. 1, and replacing the winding of the choke coil L11 in the circuit of FIG. 1 by the primary winding N1 (leakage inductor L1) of the isolation converter transformer PIT. In the primary-side switching converter of FIG. 3, a primary-side parallel resonant circuit is formed of the inductance of the choke coil L10 and the capacitance of the primary-side parallel resonant capacitor Cr, and a primary-side series resonant circuit is formed of the leakage inductor L1 of the primary winding N1 in the isolation converter transformer PIT and the capacitance of the primary-side series resonant capacitor C11.

Thus, it can be said that the primary-side switching converter of FIG. 3 is formed as a class-E switching converter that implements class-E resonant switching operation. The switching output (alternating output) arising from the switching operation of the primary-side switching converter is transmitted from the primary winding N1 equivalent to the choke coil L11 to the secondary winding N2 via magnetic coupling in the isolation converter transformer PIT. The transmitted output is rectified on the secondary side, so that the DC output voltage Eo is obtained. That is, the power supply circuit shown in FIG. 3 is constructed as a DC-DC converter that includes a class-E switching converter on its primary side.

In addition, the thus formed primary-side class-E switching converter can be regarded also as a complex resonant converter of a soft-switching power supply configuration, in which the series circuit of the primary winding N1 and the primary-side series resonant capacitor C11, which form the primary-side series resonant circuit, is connected in parallel to the switching element Q1 (and the body diode DD1), which forms the voltage resonant converter together with the choke coil L10 and/or the leakage inductor L1 (the degrees of contribution of the choke coil L10 and the leakage inductor L1 differ depending on the parameters of the respective components included in the resonant circuit) and the primary-side parallel resonant capacitor Cr.

It is generally considered that a power supply circuit including a voltage resonant converter on its primary side may not be put into practical use as it stands, since it involves a narrow control range of load power and may not maintain ZVS operation when the load is light. Therefore, the inventor of the present application has performed experiments on a power supply circuit, like the circuit shown in FIG. 16 as an example in the related art, including a secondary-side series resonant circuit combined with a primary-side voltage resonant converter, and a voltage-doubler half-wave rectifier circuit as a secondary-side rectifier circuit. The experiments revealed that this power supply circuit showed characteristics bringing the circuit closer to the realization than a power supply circuit having a voltage resonant converter in the related art.

Figure 16:
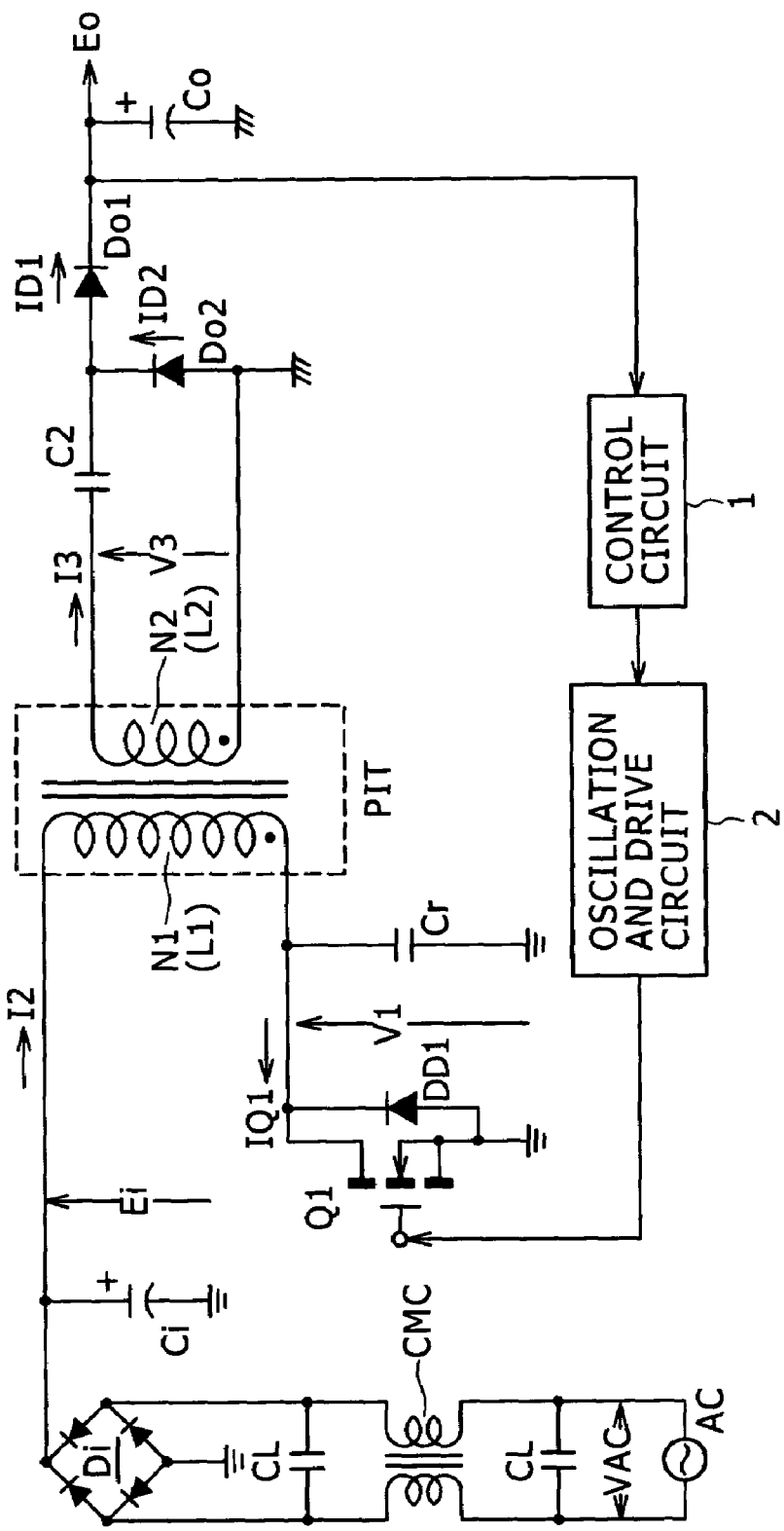
FIG. 16 is a circuit diagram illustrating a configuration example of a power supply circuit as a background art.
Figure 17:
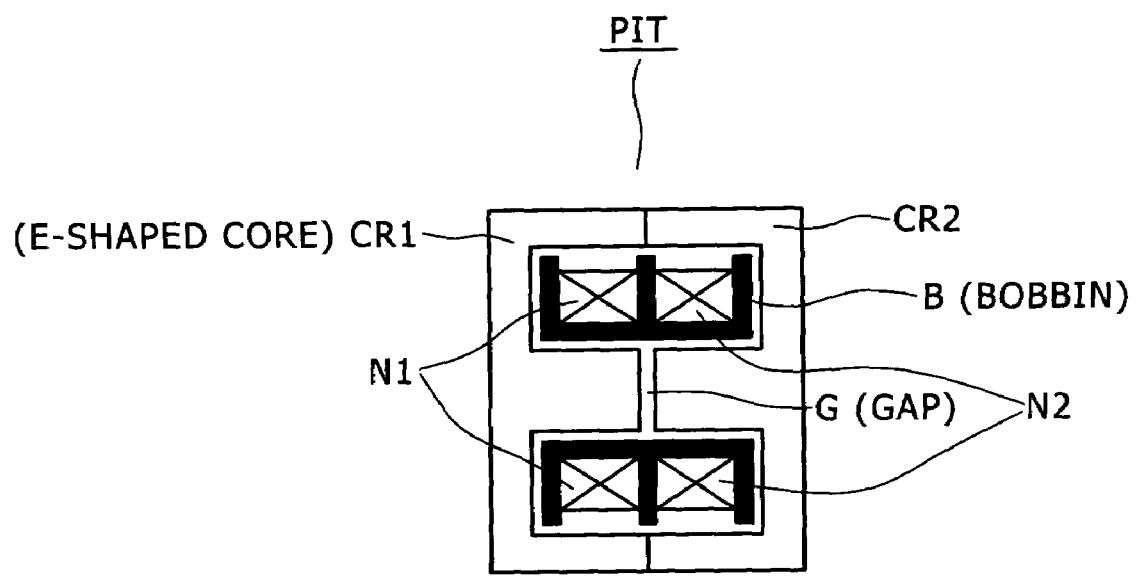
FIG. 17 is a diagram illustrating a structural example of an isolation converter transformer of the background art.
Figure 19:
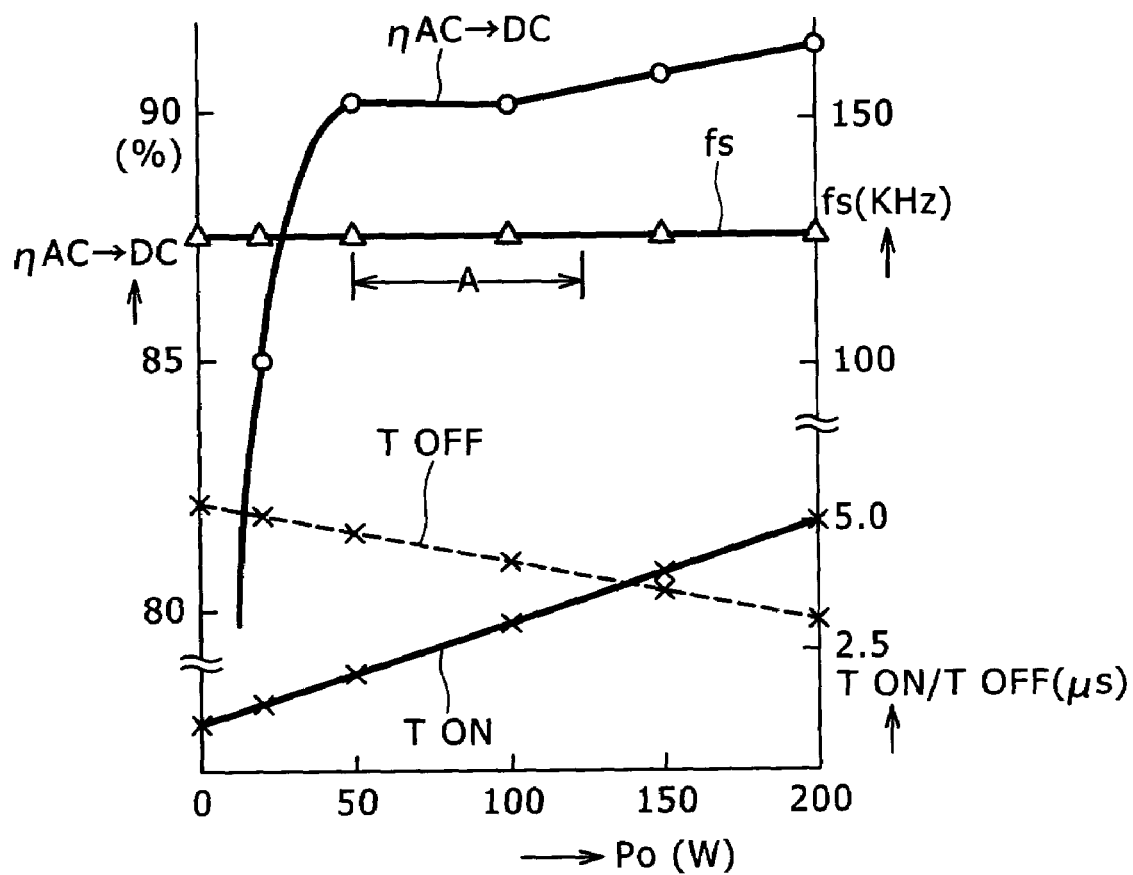
FIG. 19 is a diagram showing, as functions of the load, the variation characteristics of the AC to DC power conversion efficiency, the switching frequency, and the lengths of ON and OFF periods of a switching element, regarding the power supply circuit shown as the background art.
Figure 20:
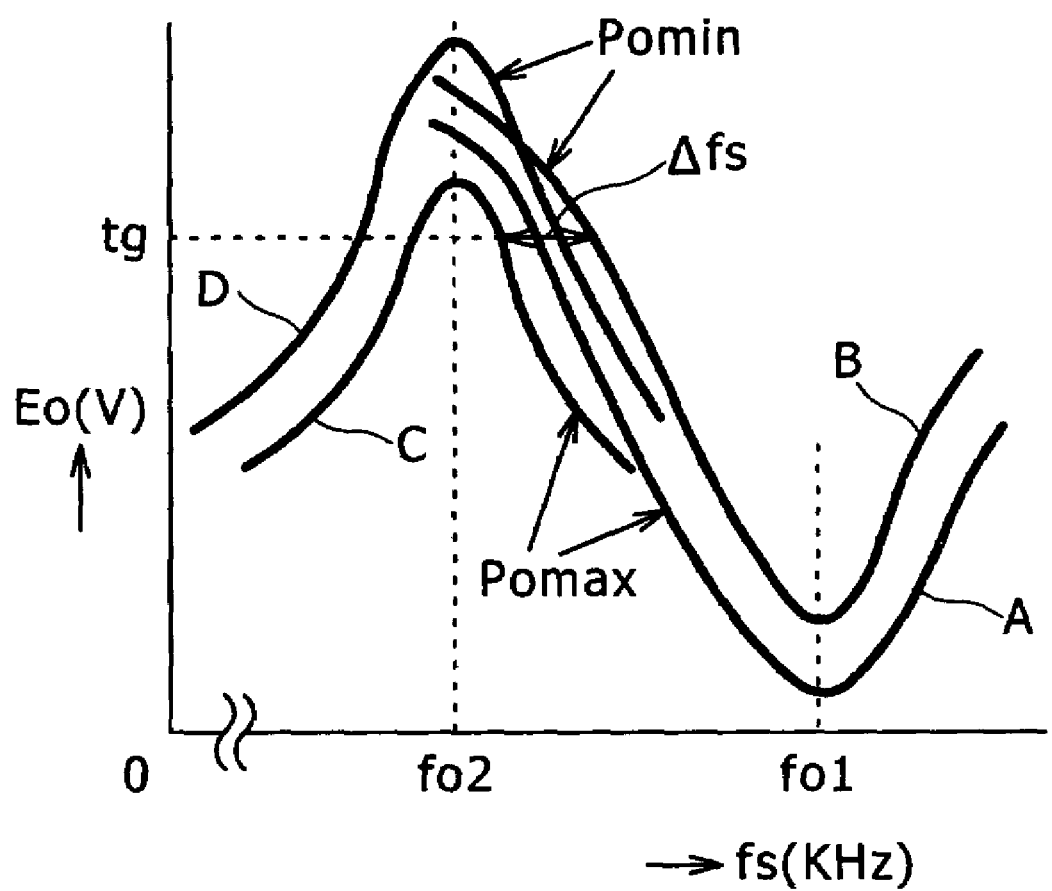
FIG. 20 is a diagram conceptually showing the constant-voltage control characteristic of the power supply circuit shown as the background art.

However, the power supply circuit of FIG. 16 involves abnormal operation when the load is an intermediate load. Specifically, as described with FIG. 18B, a current flows through the switching element Q1 in the positive direction (from the drain to the source) before the end of the OFF period (TOFF) of the switching element Q1, and thus ZVS operation fails to be achieved. Accordingly, it is still difficult to put the circuit into practical use, even with the configuration in FIG. 16.

It can be said that the power supply circuit described with FIG. 3 employs a similar configuration to that of the power supply circuit shown in FIG. 16 in the related art in terms of the point that the power supply circuit of FIG. 3 is based on a complex resonant switching converter including a voltage resonant converter circuit configuration on the primary side as described above.

However, experiments on the power supply circuit of FIG. 3 have revealed that, in this power supply circuit, abnormal operation in which ZVS is not achieved when the load is an intermediate load is absent and normal switching operation is achieved over the whole of a predetermined allowable load power range.

It has been confirmed that the abnormal operation associated with an intermediate load, observed in the power supply circuit of FIG. 16, is readily caused when the circuit has a complex resonant converter in which a voltage resonant converter is combined with a secondary-side series resonant circuit. Such abnormal operation is mainly attributed to the interaction between the primary-side parallel resonant circuit that forms the voltage resonant converter and the secondary-side series resonant circuit (rectifier circuit), due to the simultaneous operation thereof. That is, it can be concluded that the above-described abnormal operation associated with an intermediate load is attributed to the circuit configuration itself having the combination between the primary-side voltage resonant converter and the secondary-side series resonant circuit. Based on this conclusion, as a primary improvement, the power supply circuit shown in FIG. 3 is designed to have a configuration to which a class-E switching converter is applied as the primary-side switching converter instead of a voltage resonant converter.

Owing to such a configuration, in the power supply circuit of FIG. 3, the abnormal operation in which ZVS is not achieved when the load is an intermediate load is eliminated irrespective of the presence or absence of a series resonant circuit on the secondary side.

In this manner, the abnormal operation associated with an intermediate load, which is a problem in the power supply circuit of FIG. 16 as an example in the related art, is eliminated from the power supply circuit of FIG. 3.

However, in the circuit including a class-E converter combined with a multiple resonant converter, the peak level of the switching voltage V1, which is the resonant pulse voltage generated in the OFF period of the switching element Q1, is high. Specifically, when the input AC voltage VAC is 264 V, the peak level reaches 1600 V, and therefore the breakdown voltage of the switching element Q1 needs to be about 1800 V, in consideration of a margin.

Therefore, as embodiments of the invention, power supply circuit configurations that arise from further improvements from the power supply circuit shown in FIG. 3 are proposed. Specifically, each configuration is provided with a class-E switching converter for the elimination of abnormal operation associated with an intermediate load. In addition, each configuration is designed to allow use of the switching element Q1 of which breakdown voltage is low.

First Embodiment

Figure 4:
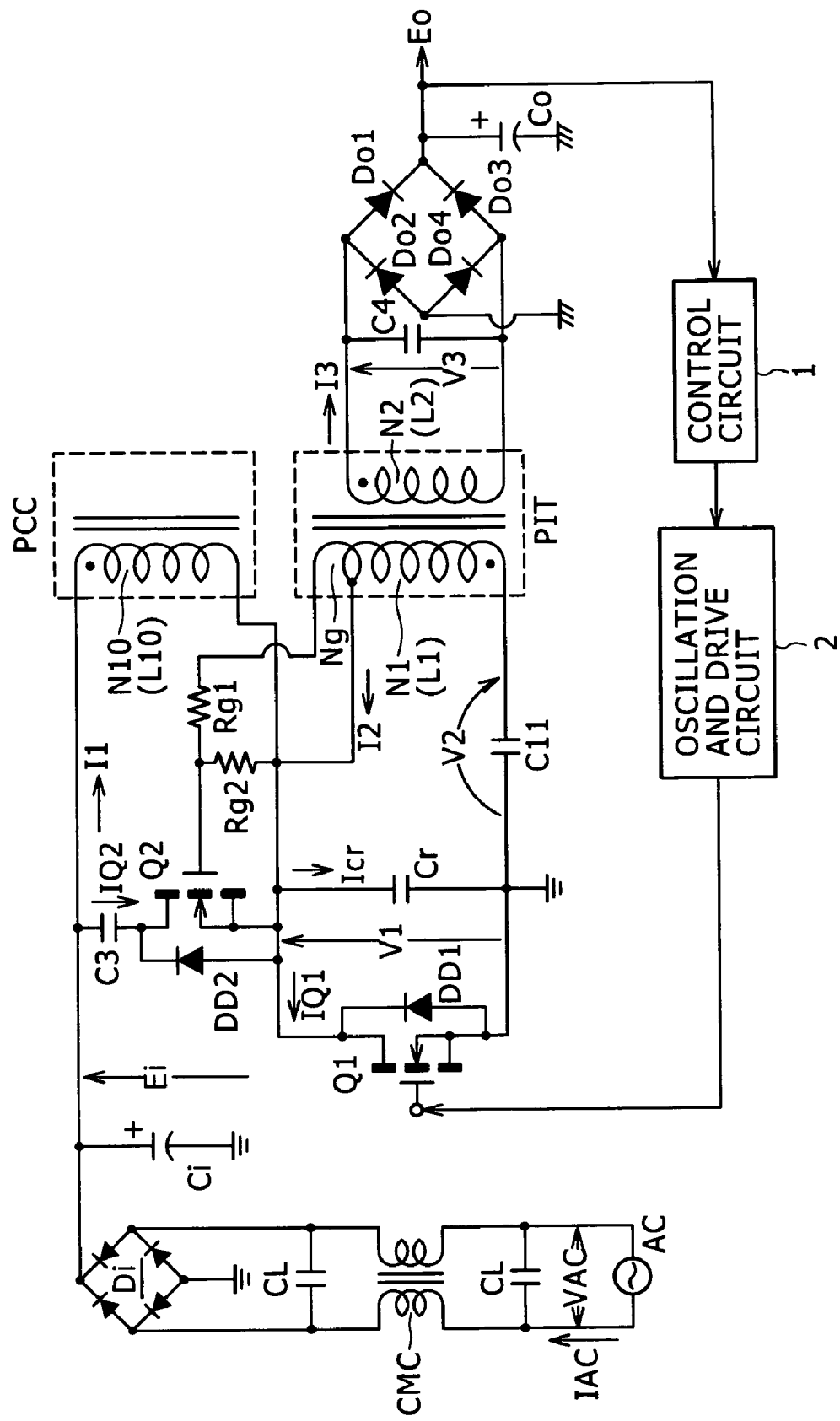
FIG. 4 is a circuit diagram illustrating a configuration example of a power supply circuit as a first embodiment of the present invention.

As one of the power supply circuits as the embodiments, a configuration example of the power supply circuit according to a first embodiment of the invention is shown in FIG. 4. The same parts in FIG. 4 as those in FIG. 3 are given the same numerals and the description therefor will be omitted.

In the power supply circuit shown in FIG. 4, a choke coil PCC (inductor L10) having a choke coil winding N10 is added to the primary side of a voltage resonant converter, so that class-E switching operation is achieved. The coupling coefficient between a primary winding N1 and a secondary winding N2 in an isolation converter transformer PIT is set to 0.8 or less, which corresponds to loose coupling. On the secondary side, a secondary-side partial voltage resonant capacitor C4 is connected in parallel to the secondary winding N2, so that a multiple resonant converter that obtains a DC output voltage from a full-wave bridge is constructed. Furthermore, a series circuit of a clamp capacitor C3 and an auxiliary switch element Q2 is connected in parallel to the choke coil PCC (inductor L10) in the multiple resonant converter.

To control the gate of the auxiliary switch element Q2, an isolation converter transformer auxiliary winding Ng as a part of the primary winding in the isolation converter transformer PIT, and resistors Rg1 and Rg2 are provided.

Each of the switching element Q1 and the auxiliary switch element Q2 in the multiple resonant converter part may be any of a MOSFET, IGBT and BJT. In the following, a circuit in which MOSFETs are used as these elements will be described.

The major parts in the power supply circuit in FIG. 4 are connected to each other as follows. One winding end of the choke coil winding N10 is connected to the positive electrode of a smoothing capacitor Ci. The other winding end of the choke coil winding N10 is connected to one winding end of the primary winding N1 in the isolation converter transformer PIT, and to the drain of the MOSFET, which is one terminal of the switching element Q1. That is, the inductor L10 is connected between the positive electrode of the smoothing capacitor Ci, and one winding end of the primary winding N1 and the drain of the MOSFET as one terminal of the switching element Q1. Furthermore, a primary-side series resonant capacitor C11 is connected between the other winding end of the primary winding N1 in the isolation converter transformer PIT and the source of the MOSFET, which is the other terminal of the switching element Q1. In addition, one electrode of a primary-side parallel resonant capacitor Cr is connected to the drain of the MOSFET as one terminal of the switching element Q1, while the other electrode of the primary-side parallel resonant capacitor Cr is connected to the source of the MOSFET as the other terminal of the switching element Q1. That is, the switching element Q1 and the primary-side parallel resonant capacitor Cr are connected in parallel to each other.

Moreover, the isolation converter transformer auxiliary winding Ng is provided so that the voltage from the isolation converter transformer auxiliary winding Ng is divided by the resistors Rg1 and Rg2, followed by being applied to the gate of the MOSFET serving as the auxiliary switch element Q2. The drain of the auxiliary switch element Q2 is connected to the clamp capacitor C3. That is, the clamp capacitor C3 and the auxiliary switch element Q2 form a series circuit. The series circuit of the clamp capacitor C3 and the auxiliary switch element Q2 is connected in parallel to the choke coil PCC (inductor L10). The isolation converter transformer auxiliary winding Ng arises from further additional winding of the primary winding N1, and hence the windings Ng and N1 are monolithically connected to each other. This structure is merely because of the connection of the source of the MOSFET serving as the auxiliary switch element Q2 to one end of the primary winding N1. Providing the winding Ng as another winding separated from the winding N1 does not lead to any problem.

In the above-described circuit configuration, the primary-side series resonant capacitor C11 is connected between the other winding end of the primary winding N1 in the isolation converter transformer PIT and the source of the switching element Q1. Thus, a primary-side series resonant circuit of which resonant frequency is dominated by the leakage inductor L1 arising in the primary winding N1 of the isolation converter transformer PIT and the primary-side series resonant capacitor C11 is formed. Furthermore, the primary-side parallel resonant capacitor Cr is connected in parallel to the switching element Q1, and thus a primary-side parallel resonant circuit of which resonant frequency is dominated by the leakage inductor L1 arising in the primary winding N1 and the primary-side parallel resonant capacitor Cr is formed. In addition, the primary side includes the series circuit of the clamp capacitor C3 and the auxiliary switch element Q2 that is connected in parallel to the choke coil PCC (inductor L10), and the auxiliary switch element Q2 is designed to conduct when the switching element Q1 is in the non-conducting state. The auxiliary switch element Q2 incorporates a body diode DD2 to thereby allow control of the ON/OFF switching for a current in one direction, and be in the ON-state for a current in the other direction, so that the passage of currents of both the directions is permitted.

In response to the switching operation of the switching element Q1, charging/discharging currents flow to and from the primary-side parallel resonant capacitor Cr during the periods when the switching element Q1 is in the OFF-state, due to the voltage resonant operation of the primary-side parallel resonant circuit. Furthermore, during the periods when the switching element Q1 is in the ON-state, the primary-side series resonant circuit implements resonant operation so that a resonant current flows through the path of the primary-side series resonant capacitor C11, the primary winding N1, and the switching element Q1.

The expression that the resonant frequency is "dominated" in the first embodiment indicates that the resonant frequency value of the primary-side series resonant circuit greatly depends on the inductance value of the leakage inductor L1 arising in the primary winding N1 and the capacitance value of the primary-side series resonant capacitor C11. The resonant frequency value of the primary-side parallel resonant circuit greatly depends on the inductance value of the leakage inductor L1 and the capacitance value of the primary-side parallel resonant capacitor Cr. The expression also indicates that influence of other components on the respective resonant frequencies is comparatively small. Strictly speaking, these resonant frequencies have a relation to the ratio between the capacitance values of the primary-side parallel resonant capacitor Cr and the primary-side series resonant capacitor C11, the ratio between the capacitance values of the smoothing capacitor Ci and the primary-side series resonant capacitor C11, and the ratio between the inductance values between the inductor L10 and the leakage inductor L1. However, these ratios are not predominant, and hence the resonant frequencies are not dominated by these ratios.

A specific description will be made below on the primary-side parallel resonant frequency as an example. Specifically, as one example, not only the primary-side parallel resonant capacitor Cr and the leakage inductor L1 but also the capacitance value of the primary-side series resonant capacitor C11, which interconnects the primary-side parallel resonant capacitor Cr and the leakage inductor L1, has influence on the primary-side parallel resonant frequency. However, if the capacitance value of the primary-side series resonant capacitor C11 is greatly larger than that of the primary-side parallel resonant capacitor Cr, the contribution of the primary-side series resonant capacitor C11 to the primary-side parallel resonance is small, and it can be determined that the primary-side parallel resonant frequency is not dominated by the primary-side series resonant capacitor C11. As another example, the connecting of the series circuit of the inductor L10 and the smoothing capacitor Ci in parallel to the leakage inductor L1 has influence on the primary-side parallel resonant frequency. In general, the capacitance value of the smoothing capacitor Ci is greatly larger than that of the primary-side parallel resonant capacitor Cr, and therefore the smoothing capacitor Ci can be regarded as being short-circuited in terms of the AC transmission. However, if the inductance value of the inductor L10 is significantly larger than that of the leakage inductor L1, the inductance value arising from the parallel connection of the inductor L10 to the leakage inductor L1 is defined substantially by the leakage inductor L1. Therefore, it can be determined that the primary-side parallel resonant frequency is not dominated by the series circuit of the inductor L10 and the smoothing capacitor Ci. It should be noted that stray capacitance components and inductance components arising in parts and interconnects are included in the primary-side parallel resonant capacitor Cr, the primary-side series resonant capacitor C11, the leakage inductor L1, and the inductor L10.

In the above-described circuit configuration, the isolation converter transformer auxiliary winding Ng is connected to the primary winding N1 so that the voltage generated in the winding Ng has such polarities that the auxiliary switch element Q2 is in the ON- (conducting-) state when the switching element Q1 is in the OFF- (non-conducting-) state. Varying the ratio between the resistance values of the resistors Rg1 and Rg2 allows adjustment of the length of the time period when the auxiliary switch element Q2 is in the ON- (conducting-) state.

On the secondary side, the isolation converter transformer PIT includes the secondary winding N2. The secondary-side rectifier element includes a plurality of rectifier diodes Do1 to Do4 that rectify an AC voltage output from the secondary winding N2. The rectified voltage produced through the rectifier diodes Do1 to Do4 is charged in a smoothing capacitor Co.

Moreover, the secondary-side partial voltage resonant capacitor C4 is provided. Therefore, partial voltage resonance arises, and thus the occurrence of switching loss at the changeover points between the ON- and OFF-states of the rectifier diodes Do1 to Do4 can be prevented, which can further enhance the efficiency of the switching power supply circuit.

Figure 5:
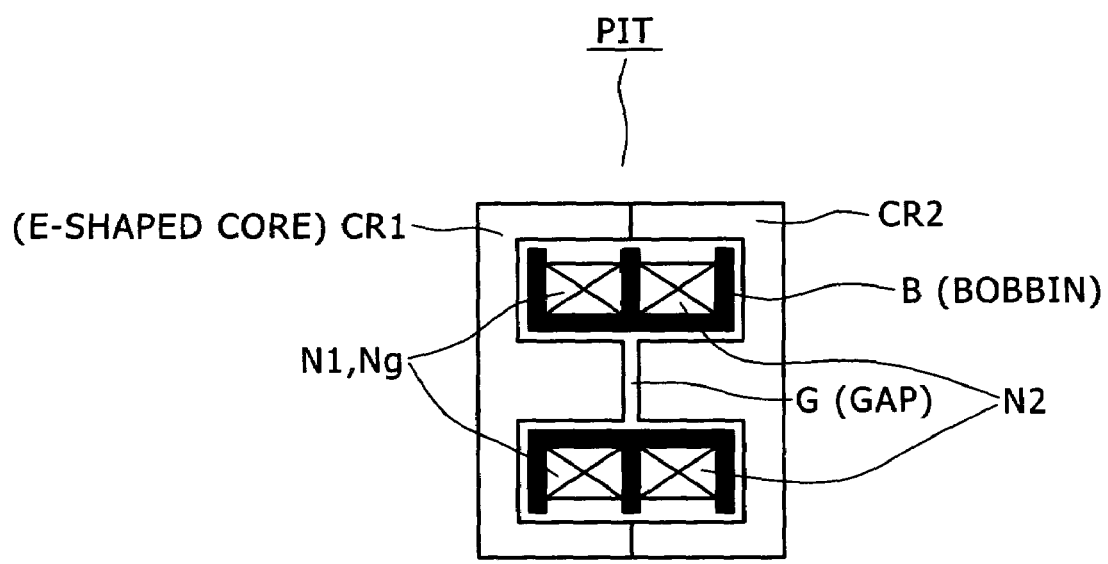
FIG. 5 is a diagram illustrating a structural example of an isolation converter transformer of the first embodiment.

More detailed features of the switching power supply circuit shown in FIG. 4 will be described below. FIG. 5 illustrates a structural example of the isolation converter transformer PIT included in the power supply circuit of FIG. 4 with the above-described configuration. The isolation converter transformer PIT includes an EE-shaped core obtained by combining E-cores CR1 and CR2 composed of a ferrite material. Furthermore, a bobbin B is provided that is formed of resin or the like and has such a divided shape that winding parts on the primary side and secondary side are independent of each other. The primary winding N1 and the isolation converter transformer auxiliary winding Ng are wound around one winding part of the bobbin B. The secondary winding N2 is wound around the other winding part.

The bobbin B around which the primary-side and secondary-side windings have been thus wound is fitted to the EE-shaped core (CR1, CR2), which results in the state where the primary winding N1, the isolation converter transformer auxiliary winding Ng, and the secondary winding N2 on different winding regions are wound around the center leg of the EE-shaped core. In this manner, the entire structure of the isolation converter transformer PIT is completed.

In the center leg of the EE-shaped core, a gap G is formed as shown in the drawing. Thus, such a coupling coefficient k as to offer a loose coupling state is obtained. That is, the degree of loose coupling is higher in the isolation converter transformer PIT in FIG. 4, compared with that in the power supply circuit shown in FIG. 16 as a technique in the related art. The gap G can be formed by setting the center legs of the E-cores CR1 and CR2 to be shorter than the respective two outer legs thereof. In the present embodiment, EER-35 is used as the core member, and the length of the gap G is set to 1.6 mm. The numbers of turns of the primary winding N1, the secondary winding N2, and the isolation converter transformer auxiliary winding Ng are set to 60 T, 30 T, and 1 T, respectively. The coupling coefficient k between the primary and secondary sides of the isolation converter transformer PIT itself is set to 0.75.

The choke coil PCC can also be constructed by providing a winding around an EE-shaped core with predetermined shape and size. In the present embodiment, ER-28 is used as the core member, the length of the gap G is set to 0.8 mm, and the number of turns of the choke coil winding N10 is set to 50 T. Thus, 1 mH (millihenry) is obtained as the inductance value of the inductor L10.

The parameters of major parts in the power supply circuit of FIG. 4 were chosen as follows, so that experimental results to be described later on this power supply circuit were obtained.

The capacitances of the primary-side parallel resonant capacitor Cr, the primary-side series resonant capacitor C11, the clamp capacitor C3, and the secondary-side partial voltage resonant capacitor C4 were chosen as follows:

Cr=1500 pF
C11=0.01 µF
C3=0.1 µF
C4=3300 pF

The resistance values of the resistors Rg1 and Rg2 were chosen as follows:

Rg1=150Ω (ohm)
Rg2=100Ω

The allowable load power range was from the maximum load power Pomax of 300 W to the minimum load power Pomin of 0 W (no load). The rated level of the DC output voltage Eo was 175 V.

Figure 6:
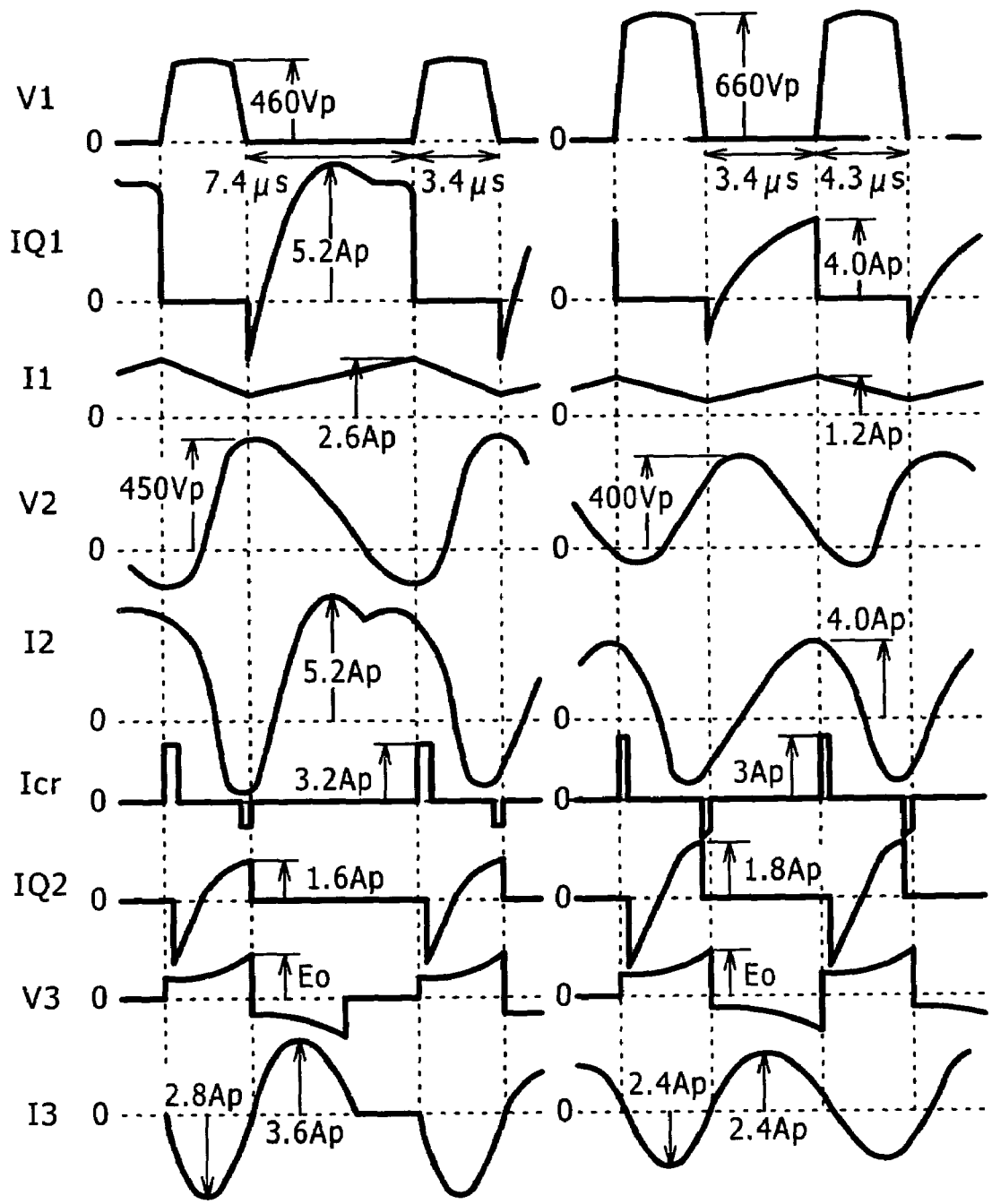
FIGS. 6A and 6B are waveform diagrams showing the operation of major parts in the power supply circuit as the first embodiment, with reflecting the corresponding switching cycle.

The experimental results on the power supply circuit of FIG. 4 are shown in the waveform diagrams of FIGS. 6A and 6B. FIG. 6A shows the waveforms of currents and voltages under the condition of the maximum load power Pomax of 300 W and the input AC voltage VAC of 100 V. More specifically, FIG. 6A shows a switching voltage V1 that is the voltage across the switching element Q1, a switching current IQ1 that is the current flowing through the switching element Q1, and an input current I1 that is the current flowing through the choke coil PCC. FIG. 6A also shows a primary-side series resonant voltage V2 that is the voltage across the primary-side series resonant capacitor C11, a primary winding current I2 that is the current flowing through the primary winding N1, and a primary-side parallel resonant current ICr that is the current flowing to the primary-side parallel resonant capacitor Cr. In addition, FIG. 6A further shows an auxiliary switch current IQ2 that is the current flowing through the auxiliary switch element Q2, a secondary winding voltage V3 that is the voltage generated in the secondary winding N2, and a secondary winding current I3 that is the current flowing through the secondary winding N2.

FIG. 6B shows the switching voltage V1, the switching current IQ1, the input current I1, the primary-side series resonant voltage V2, the primary winding current I2, the primary-side parallel resonant current ICr, the auxiliary switch current IQ2, the secondary winding voltage V3, and the secondary winding current I3, under the condition of the maximum load power Pomax of 300 W and the input AC voltage VAC of 230 V.

The basic operation of the power supply circuit in FIG. 4 will be described below with reference to the waveform diagrams of FIG. 6A.

The switching element Q1 is provided with the voltage across the smoothing capacitor Ci as the DC input voltage Ei, and implements switching operation.

The switching voltage V1 (voltage between the drain and source of the switching element Q1) has a waveform dependent upon the switching ON/OFF of the channel between the drain and source of the switching element Q1 associated with the driving of the switching element Q1 due to a signal from the oscillation and drive circuit 2. Since the auxiliary switch current IQ2 flows to the clamp capacitor C3, the degree of the rise of the switching voltage V1 is suppressed. Specifically, the peak level of the voltage V1 is 460 V when the input AC voltage VAC is 100 V, and is 660 V when the voltage VAC is 230 V. If the auxiliary switch element Q2 and the clamp capacitor C3 are absent, a sinusoidal resonant pulse waveform is obtained during the OFF period as the waveform of the switching voltage V1. In contrast, in the power supply circuit of FIG. 4, the peak part of the sinusoidal resonant pulse waveform is clamped. However, the waveform in the vicinities of rising edges of the clamped sinewave is substantially similar to that of the non-clamped sinewave. Therefore, also when the switching voltage V1 is clamped, the advantage that ZVS operation is ensured at the turn-OFF timing of the switching element Q1 is sufficiently achieved.

The switching current IQ1 (current flowing through the switching element Q1) is the current flowing through the switching element Q1 (and a body diode DD1) from the drain side thereof. Each switching cycle is divided into the period TON during which the switching element Q1 should be in the ON-state, and the period TOFF during which it should be in the OFF-state. The switching voltage V1 has a waveform in which the voltage is at the zero level during the period TON and is a resonant pulse during the period TOFF. This voltage resonant pulse of the switching voltage V1 is obtained as a pulse having a sinusoidal resonant waveform due to the resonant operation of the primary-side parallel resonant circuit.

The switching current IQ1 is at the zero level during the period TOFF. When the period TOFF ends and the period TON starts, i.e., at the turn-ON timing of the switching element Q1, initially the switching current IQ1 flows through the body diode DD1 and therefore has the negative polarity waveform. Subsequently, the flow direction is inverted so that the switching current IQ1 flows from the drain to the source of the switching element Q1 and hence has the positive polarity waveform.

The input current I1 (current flowing from the smoothing capacitor Ci to the primary-side switching converter) flows via the synthetic inductance between the inductance of the inductor L10 formed by the choke coil winding N10 and the inductance of the leakage inductor L1 of the primary winding N1. Thus, the current flowing from the smoothing capacitor Ci to the switching converter is a ripple current.

The primary-side series resonant voltage V2 (voltage across the primary-side series resonant capacitor C11) has an alternating waveform that depends on the switching cycle and is close to a sinusoidal waveform.

The primary winding current I2 (current flowing through the primary winding N1) is the current that flows through the primary winding N1 depending on the switching operation of the switching element Q1. In the circuit of FIG. 4, the primary winding current I2 has a waveform that is substantially the same as the waveform resulting from synthesis between the switching current IQ1 and the primary-side parallel resonant current ICr. Due to the ON/OFF operation of the switching element Q1, a resonant pulse voltage, which is the switching voltage V1 in the period TOFF, is applied to the series circuit of the primary winding N1 and the primary-side series resonant capacitor C11, which form the primary-side series resonant circuit. Thus, the primary-side series resonant circuit implements resonant operation, and the primary winding current I2 has an alternating waveform that includes a sinewave component and depends on the switching cycle.

When the period TON ends and the period TOFF starts, i.e., at the turn-OFF timing of the switching element Q1, the primary winding current I2 flows to the primary-side parallel resonant capacitor Cr with the positive polarity as the primary-side parallel resonant current ICr, and thus operation of charging the primary-side parallel resonant capacitor Cr is started. In response to this charging, the switching voltage V1 starts to rise from the zero level with a sinusoidal waveform, i.e., a voltage resonant pulse rises up. When the polarity of the primary-side parallel resonant current ICr turns to the negative polarity, the state of the primary-side parallel resonant capacitor Cr changes from the charging state to the discharging state, which causes the voltage resonant pulse to fall down from its peak level. This operation indicates that, at the turn-ON and turn-OFF timings of the switching element Q1, ZVS operation due to the primary-side parallel resonant circuit and ZCS operation due to the primary-side series resonant circuit are achieved. As described above, the primary-side parallel resonant current ICr (current flowing to the primary-side parallel resonant capacitor Cr) flows at the timings of rising-up and falling-down of the switching voltage V1, to thereby reduce the switching loss of the switching element Q1.

The auxiliary switch current IQ2 (current flowing through the auxiliary switch element Q2) flows to thereby clamp the switching voltage V1 every time the switching element Q1 is turned OFF, so that application of an overvoltage between the drain and source of the switching element Q1 is prevented. Specifically, the phase of the primary winding current I2 and the voltage generated in the primary winding N1 is shifted by 90 degrees from that of the voltage generated in the isolation converter transformer auxiliary winding Ng. Thus, at the timing when the switching element Q1 is turned OFF, such a voltage that the auxiliary switch element Q2 is switched ON is generated across the isolation converter transformer auxiliary winding Ng, and hence the auxiliary switch element Q2 is turned ON. Accordingly, a current flows to the clamp capacitor C3, which prevents a rise of the voltage between the drain and source of the switching element Q1.

The secondary winding voltage V3 (voltage across the secondary winding N2, i.e., the voltage across the connection circuit of the secondary winding N2 and the secondary-side partial voltage resonant capacitor C4) is clamped at the levels having the absolute value equal to the DC output voltage Eo in the conducting periods of the rectifier diodes Do1 to Do4.

The secondary winding current I3 (current flowing through the secondary winding N2) is a current partially including a sinusoidal waveform.

Figure 7:
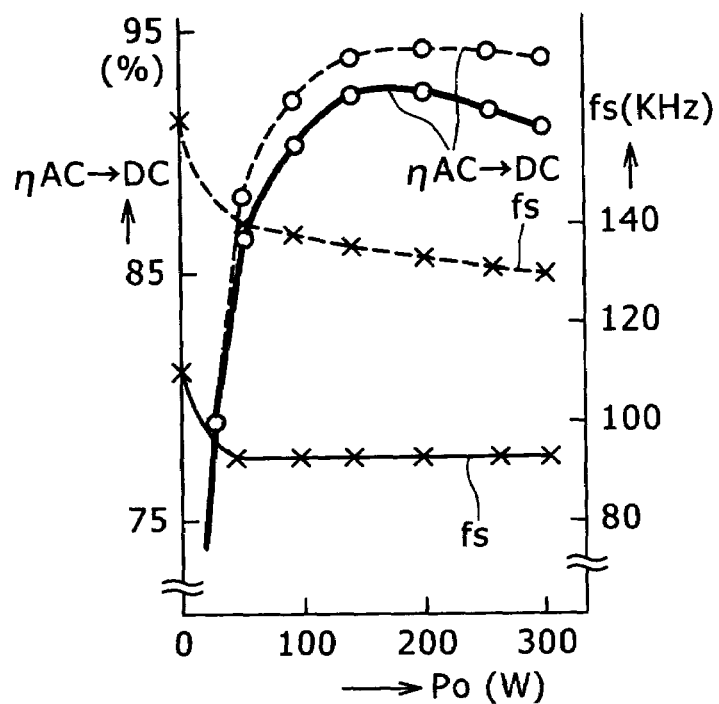
FIG. 7 is a diagram showing, as functions of the load, the variation characteristics of the AC to DC power conversion efficiency and switching frequency of the power supply circuit as the first embodiment.

The characteristics of the power supply circuit of the first embodiment shown in FIG. 4 will be described with reference to FIGS. 7 and 8. FIG. 7 shows the changes of the AC to DC power conversion efficiency ($\eta AC \rightarrow DC$) and the switching frequency fs of the modified class-E switching operation multiple resonant converter of the first embodiment in the load power range from 0 W to 300 W when the input AC voltage VAC is 100 V, and when the voltage VAC is 230 V. The full line in FIG. 7 indicates the characteristics when the input AC voltage VAC is 100 V, while the dashed line indicates those when the voltage VAC is 230 V.

Figure 8:
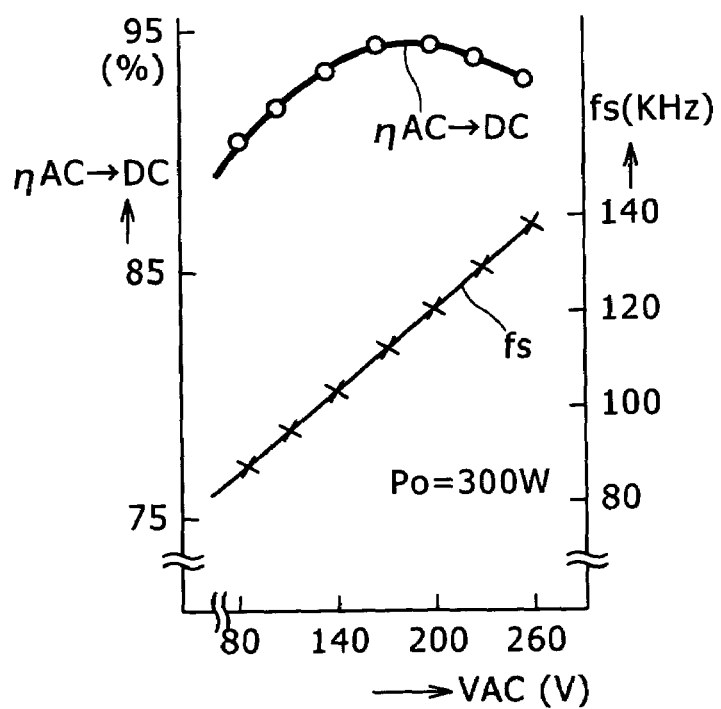
FIG. 8 is a diagram showing, as functions of the AC input voltage, the variation characteristics of the AC to DC power conversion efficiency and switching frequency of the power supply circuit as the first embodiment.

FIG. 8 shows the changes of the AC to DC power conversion efficiency ($\eta AC \rightarrow DC$) and the switching frequency fs of the modified class-E switching operation multiple resonant converter of the first embodiment in the range of the input AC voltage VAC from 85 V to 230 V when the load power is 300 W.

Referring to FIG. 7, the results when the input AC voltage VAC was 100 V were as follows: the AC to DC power conversion efficiency reached 91.0%; and the range of the switching frequency fs was from 89.3 kHz to 110.0 kHz, and hence the width of the variable range Δfs of the switching frequency fs was 20.7 kHz. Furthermore, the results when the input AC voltage VAC was 230 V were as follows: the AC to DC power conversion efficiency reached 94.0%; and the range of the switching frequency fs was from 132.2 kHz to 147 kHz, and hence the width of the variable range Δfs of the switching frequency fs was 14.8 kHz. Both when the input AC voltage VAC is 100 V and when it is 230 V, the width of the variable range Δfs of the switching frequency fs is smaller than that in the circuit shown in FIG. 16 as a background art. The reason for this is that the provision of the isolation converter transformer auxiliary winding Ng in the isolation converter transformer PIT allows the time ratio between the ON periods of the switching element Q1 and the auxiliary switch element Q2 (the ratio of the period TON to the period TOFF) to be changed in response to variation in the load power and the input AC voltage VAC, which can narrow the variable range Δfs.

Referring to FIG. 8, when load power of 300 W is supplied, the switching frequency fs increases as the input AC voltage VAC increases. The AC to DC power conversion efficiency ($\eta AC \rightarrow DC$) is a high value of 94.5% in the range of the input AC voltage VAC from 170 V to 220 V. The value of the AC to DC power conversion efficiency ($\eta AC \rightarrow DC$) is higher in a wider AC input voltage range, compared with in the circuit shown in FIG. 16 as a background art.

In the power supply circuit shown in FIG. 16 as an example in the related art, the current that flows from the smoothing capacitor Ci into the switching converter passes through the primary winding N1 in the isolation converter transformer PIT, and then reaches the switching element Q1 and the primary-side parallel resonant capacitor Cr. This current flowing from the smoothing capacitor Ci to the switching converter is the primary winding current I2, and has a comparatively high frequency dependent upon the switching cycle. That is, charging and discharging currents flow to and from the smoothing capacitor Ci with a frequency higher than the frequency of the commercial AC supply voltage.

An aluminum electrolytic capacitor is often employed for a component element as the smoothing capacitor Ci because of the need for the capacitor Ci to have a high breakdown voltage, and so on. The aluminum electrolytic capacitor has an increased tendency to suffer from lowering of the electrostatic capacitance and an increase of the tangent of the loss angle when being operated at a high frequency, compared with other kinds of capacitors. Therefore, there is a need to choose, as the aluminum electrolytic capacitor for the smoothing capacitor Ci, a special product of which equivalent series resistance (ESR) is low, and of which allowable ripple current is large. In addition, there is also a need to increase the capacitance of the component as the smoothing capacitor Ci correspondingly. For example, in the configuration of the power supply circuit in FIG. 16, the capacitance needs to be about 1000 pF in order to address the maximum load power Pomax of 300 W, which is the same as the maximum load power in the first embodiment. An aluminum electrolytic capacitor compatible with these components is more expensive than general-purpose aluminum electrolytic capacitors, and the increase of the capacitance leads to a rise of the component price. Therefore, use of such a special capacitor is disadvantageous in terms of costs.

In contrast, in the power supply circuit of the first embodiment in FIG. 4, the current that flows from the smoothing capacitor Ci into the switching converter passes through the series connection of the choke coil winding N10 and the primary winding N1, and then reaches the switching element Q1. Therefore, the current flowing from the smoothing capacitor Ci to the switching converter becomes a DC current as indicated by the input current I1 of FIG. 6A. Since the current flowing from the smoothing capacitor Ci to the switching converter is a DC current, the present embodiment does not involve the above-described problems of lowering of the electrostatic capacitance and an increase of the tangent of the loss angle. Furthermore, along with this, a ripple with the cycle of the commercial AC supply voltage in the DC input voltage Ei is also reduced. Due to these reasons, in the present embodiment, a general-purpose aluminum electrolytic capacitor can be chosen as the smoothing capacitor Ci. In addition, the capacitance of the component as the smoothing capacitor Ci can be lowered compared with in the circuit of FIG. 16, since the ripple voltage is small. Thus, the present embodiment can achieve cost reduction of the smoothing capacitor Ci. Furthermore, the waveform of the input current I1 is a sinusoidal waveform. This contributes to achievement of a high-frequency noise reduction effect.

Figures 18A, 18B, 18C:
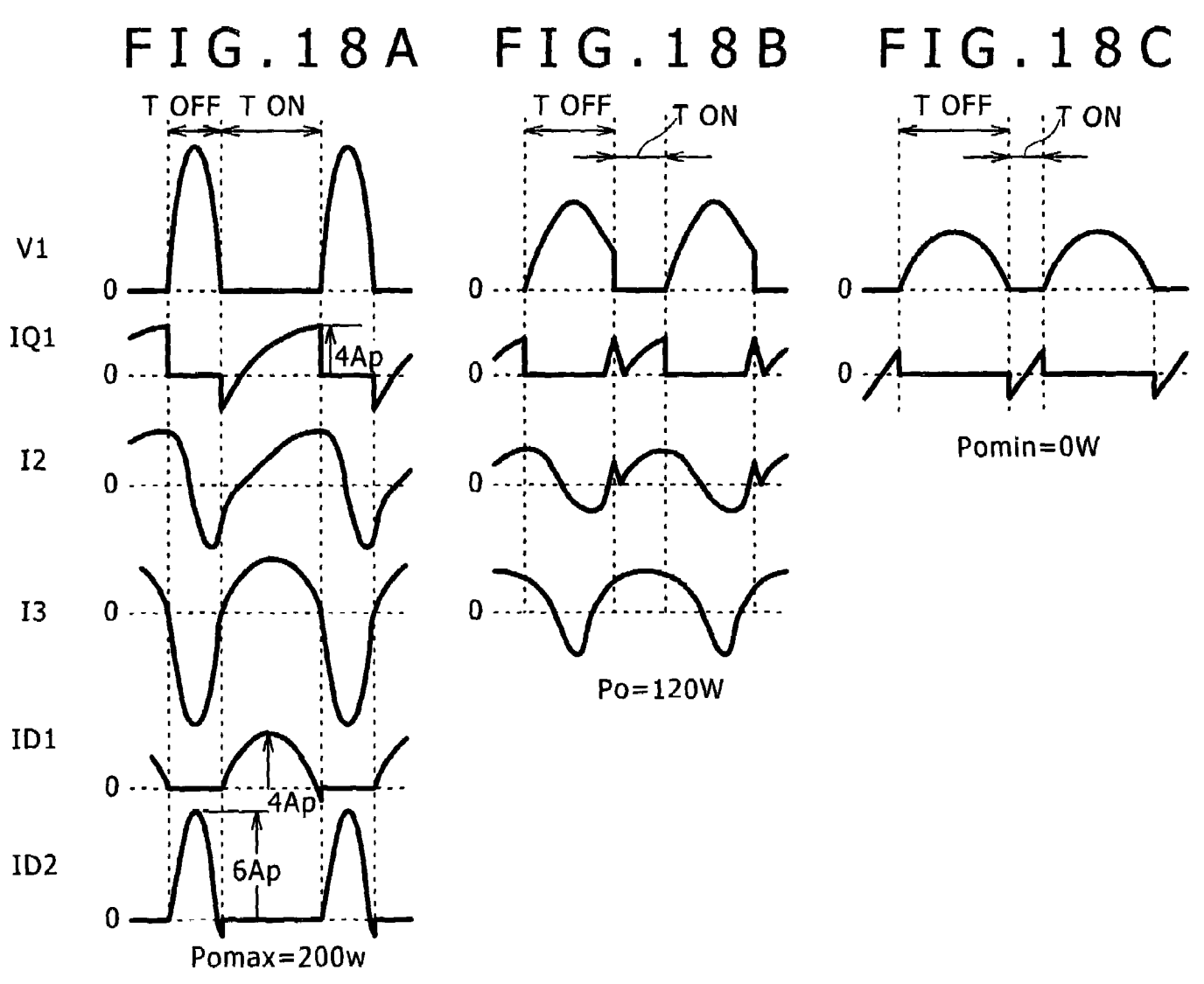

Furthermore, in the circuit of FIG. 4, in which a class-E switching converter is applied to the primary-side switching converter, abnormal operation associated with an intermediate load is absent irrespective of the presence or absence of a secondary-side series resonant circuit, and adequate ZVS operation is achieved. In this abnormal operation phenomenon, as shown in FIG. 18B, the switching element Q1 is turned ON and thus the positive switching current IQ1 flows between the source and drain thereof before the original turn-ON timing of the switching element Q1 (the start timing of the period TON). Such behavior of the switching current IQ1 increases switching loss. The present embodiment prevents the occurrence of this behavior of the switching current IQ1 corresponding to the abnormal operation, to thereby eliminate the increase of switching loss. This feature is also one factor in the enhancement of the power conversion efficiency.

As is apparent from a comparison between the switching currents IQ1 of FIGS. 6A and 18A, the switching current IQ1 of FIG. 6A, corresponding to the present embodiment, has a waveform in which current peaks appear at timings before the end timings of the period TON. The waveform of the switching current IQ1 shown in FIG. 6A indicates that the level of the switching current IQ1 at the turn-OFF timing of the switching element Q1 is suppressed. If the level of the switching current IQ1 at the turn-OFF timing is suppressed, the switching loss at the turn-OFF timing is correspondingly reduced, which enhances the power conversion efficiency.

Such a waveform of the switching current IQ1 is due to the class-E switching operation of the primary-side switching converter. Furthermore, in the present embodiment, the waveform of the input current I1 is a ripple waveform. This contributes to achievement of a high-frequency noise reduction effect.

In addition, the auxiliary switch element Q2 and the clamp capacitor C3 are provided so that the auxiliary switch current IQ2 flows in sync with the OFF period of the switching element Q1. Thus, even when the input AC voltage VAC is 230 V, the maximum value of the voltage applied to the switching element Q1 is as low as about 660 V. Accordingly, the breakdown voltage necessary for the switching element Q1 can be significantly lowered, which facilitates the choice of the switching element Q1 and can decrease costs of the switching power supply circuit. If the auxiliary switch element Q2 and the clamp capacitor C3 are not provided, the breakdown voltage of the switching element Q1 needs to be about 1800 V. In this case, if a MOSFET is used as the switching element Q1, the ON resistance value thereof is about 7Ω. In contrast, if the auxiliary switch element Q2 and the clamp capacitor C3 are provided, it is sufficient for the breakdown voltage of the switching element Q1 to be as low as 900 V. At this time, the ON resistance value of this switching element Q1 is about 1.2Ω. Therefore, loss due to the ON resistance is reduced and the AC to DC power conversion efficiency is enhanced. Moreover, the choice of the switching element Q1 is facilitated and a cost decrease is allowed. Power consumption by the auxiliary switch element Q2 is small, and the gate drive circuit therefor can be formed merely by adding the resistors Rg1 and Rg2 and the isolation converter transformer auxiliary winding Ng. Therefore, when a cost reduction due to the decrease of the breakdown voltage of the switching element Q1 is taken into consideration, there is no total cost rise accompanied by the provision of the auxiliary switch element Q2, and in fact, the cost of the entire device is decreased.

(Modifications)

Figure 9:
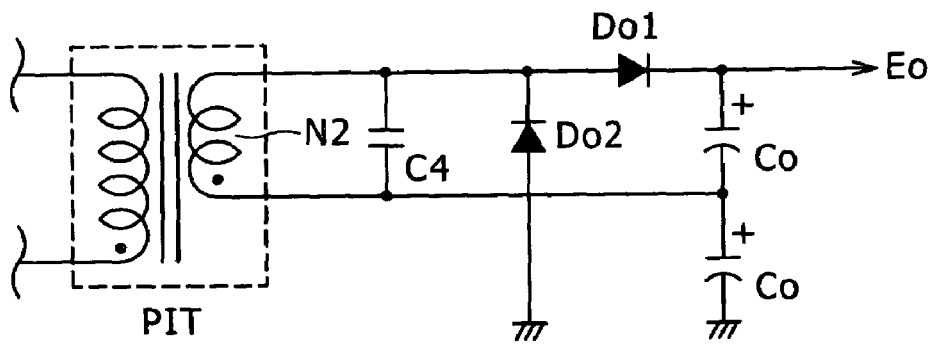
FIG. 9 is a diagram illustrating a modification of a secondary-side circuit of the first embodiment.
Figure 10:
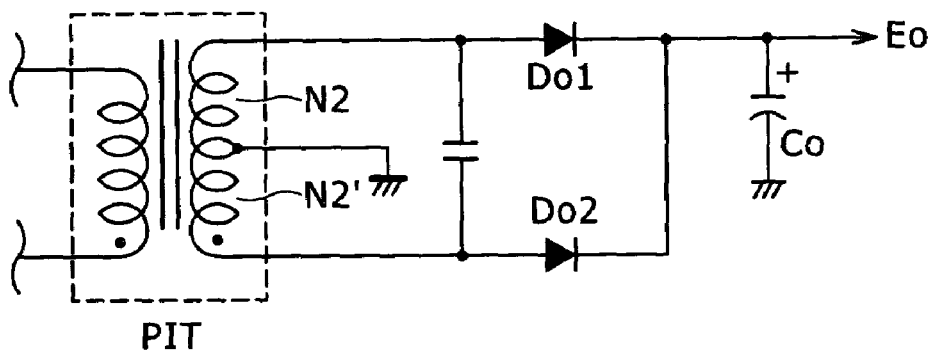
FIG. 10 is a diagram illustrating another modification of the secondary-side circuit of the first embodiment.
Figure 11:
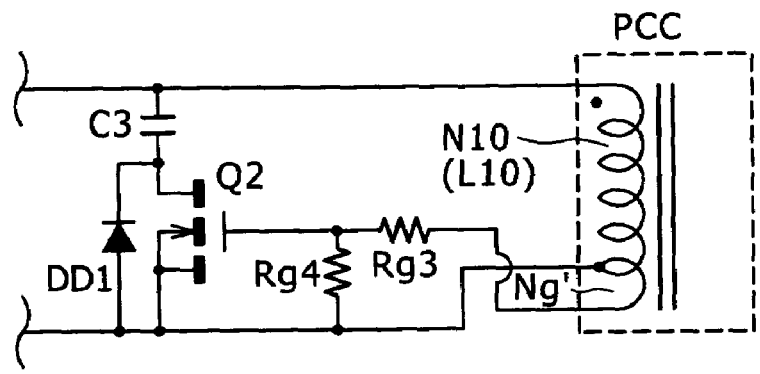
FIG. 11 is a diagram illustrating a modification of a primary-side circuit of the first embodiment.

FIGS. 9 and 10 illustrate modifications of the secondary-side circuit of the power supply circuit of the first embodiment. FIG. 11 illustrates a modification of the primary-side circuit thereof. The circuit shown in FIG. 9 is a voltage-doubler half-wave rectifier circuit. This circuit offers advantages similar to those by the above-described embodiment, and particularly can offer an advantage of achieving a doubled rectified voltage. The circuit shown in FIG. 10 is a full-wave rectifier circuit that includes a secondary winding N2 and a secondary winding N2' as a winding provided with a center tap. This circuit also offers advantages similar to those by the above-described embodiment, and particularly can offer an advantage that full-wave rectification can be achieved with two rectifier diodes.

In the circuit shown in FIG. 11, instead of an isolation converter transformer auxiliary winding Ng in an isolation converter transformer PIT for generating the drive voltage for an auxiliary switch element Q2, a choke coil auxiliary winding Ng' added to a choke coil PCC is provided, and a voltage divided by resistors Rg3 and Rg4 is applied as the gate voltage for the auxiliary switch element Q2. This circuit offers advantages similar to those by the above-described embodiment, and particularly can offer an advantage that the choke coil PCC and the circuitry relating to the auxiliary switch element Q2 can be arranged close to each other. The resistance values of the resistors Rg3 and Rg4 are e.g. 68Ω and 100Ω, respectively.

Second Embodiment

Figure 12:
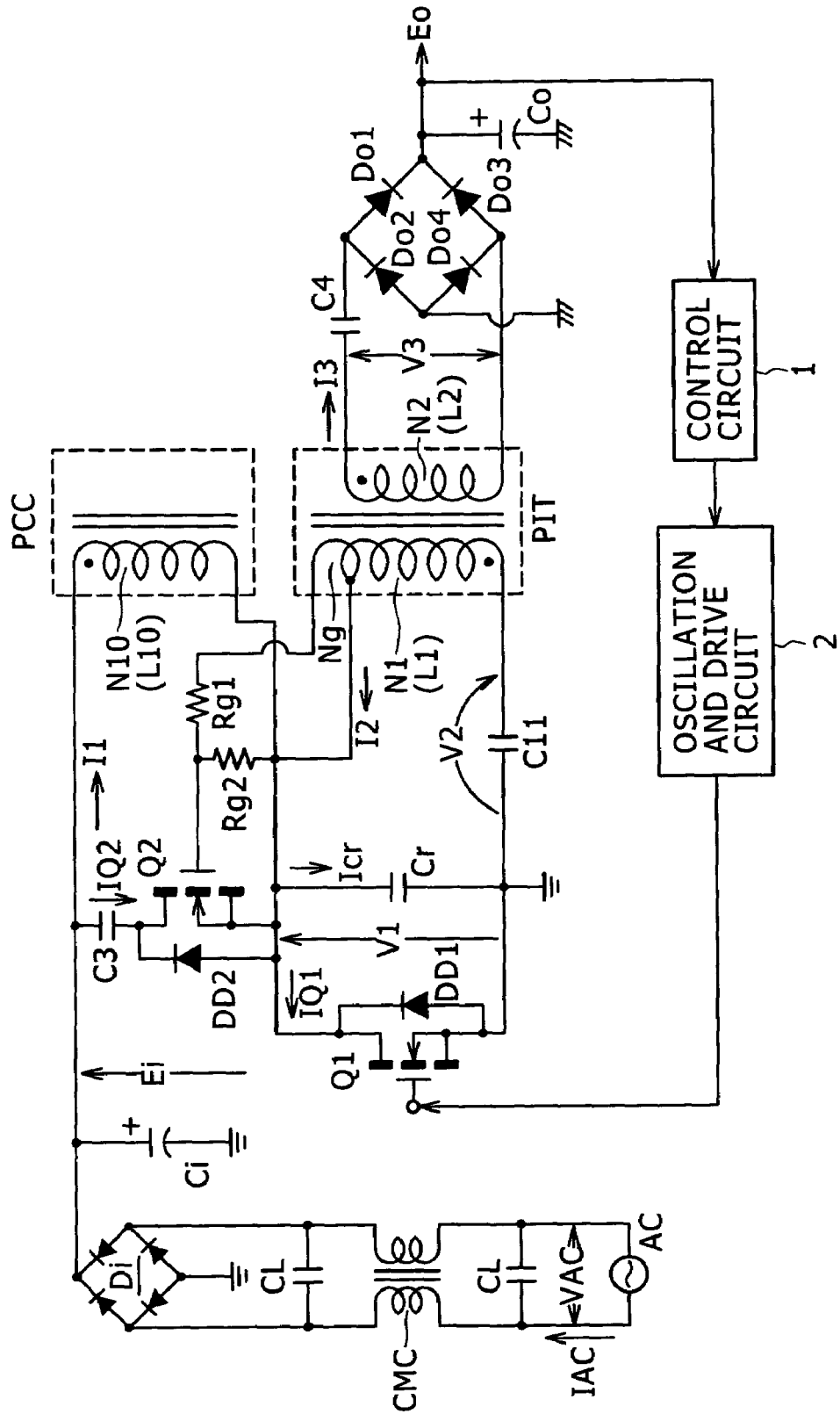
FIG. 12 is a circuit diagram illustrating a configuration example of a power supply circuit as a second embodiment of the invention.

FIG. 12 illustrates a configuration example of the power supply circuit according to a second embodiment of the invention. The same parts in FIG. 12 as those in FIG. 4 are given the same numerals and the description therefor will be omitted.

In the power supply circuit shown in FIG. 12, a choke coil PCC (inductor L10) having a choke coil winding N10 is added to the primary side of a voltage resonant converter, so that class-E switching operation is achieved. The coupling coefficient between a primary winding N1 and a secondary winding N2 in an isolation converter transformer PIT is set to 0.8 or less, which corresponds to loose coupling. On the secondary side, a secondary-side series resonant capacitor C4 is connected in series to the secondary winding N2, so that a multiple resonant converter that obtains a DC output voltage from a full-wave bridge is constructed. Furthermore, a series circuit of a clamp capacitor C3 and an auxiliary switch element Q2 is connected in parallel to the choke coil PCC (inductor L10) in the multiple resonant converter.

To control the gate of the auxiliary switch element Q2, an isolation converter transformer auxiliary winding Ng as a part of the primary winding in the isolation converter transformer PIT, and resistors Rg1 and Rg2 are provided.

Each of the switching element Q1 and the auxiliary switch element Q2 in the multiple resonant converter part may be any of a MOSFET, IGBT and BJT. In the following, a circuit in which MOSFETs are used as these elements will be described.

The major parts in the power supply circuit in FIG. 12 are connected to each other as follows. One winding end of the choke coil winding N10 is connected to the positive electrode of a smoothing capacitor Ci. The other winding end of the choke coil winding N10 is connected to one winding end of the primary winding N1 in the isolation converter transformer PIT, and to the drain of the MOSFET, which is one terminal of the switching element Q1. That is, the inductor L10 is connected between the positive electrode of the smoothing capacitor Ci, and one winding end of the primary winding N1 and the drain of the MOSFET as one terminal of the switching element Q1. Furthermore, a primary-side series resonant capacitor C11 is connected between the other winding end of the primary winding N1 in the isolation converter transformer PIT and the source of the MOSFET, which is the other terminal of the switching element Q1. In addition, one electrode of a primary-side parallel resonant capacitor Cr is connected to the drain of the MOSFET as one terminal of the switching element Q1, while the other electrode of the primary-side parallel resonant capacitor Cr is connected to the source of the MOSFET as the other terminal of the switching element Q1. That is, the switching element Q1 and the primary-side parallel resonant capacitor Cr are connected in parallel to each other.

Moreover, the isolation converter transformer auxiliary winding Ng is provided so that the voltage from the isolation converter transformer auxiliary winding Ng is divided by the resistors Rg1 and Rg2, followed by being applied to the gate of the MOSFET serving as the auxiliary switch element Q2. The drain of the auxiliary switch element Q2 is connected to the clamp capacitor C3. That is, the clamp capacitor C3 and the auxiliary switch element Q2 form a series circuit. The series circuit of the clamp capacitor C3 and the auxiliary switch element Q2 is connected in parallel to the choke coil PCC (inductor L10). The isolation converter transformer auxiliary winding Ng arises from further additional winding of the primary winding N1, and hence the windings Ng and N1 are monolithically connected to each other. This structure is merely because of the connection of the source of the MOSFET serving as the auxiliary switch element Q2 to one end of the primary winding N1. Providing the winding Ng as another winding separated from the winding N1 does not lead to any problem.

In the above-described circuit configuration, the primary-side series resonant capacitor C11 is connected between the other winding end of the primary winding N1 in the isolation converter transformer PIT and the source of the switching element Q1. Thus, a primary-side series resonant circuit of which resonant frequency is dominated by the leakage inductor L1 arising in the primary winding N1 of the isolation converter transformer PIT and the primary-side series resonant capacitor C11 is formed. Furthermore, the primary-side parallel resonant capacitor Cr is connected in parallel to the switching element Q1, and thus a primary-side parallel resonant circuit of which resonant frequency is dominated by the leakage inductor L1 arising in the primary winding N1 and the primary-side parallel resonant capacitor Cr is formed. In addition, the primary side includes the series circuit of the clamp capacitor C3 and the auxiliary switch element Q2 that is connected in parallel to the choke coil PCC (inductor L10), and the auxiliary switch element Q2 is designed to conduct when the switching element Q1 is in the non-conducting state. The auxiliary switch element Q2 incorporates a body diode DD2 to thereby allow control of the ON/OFF switching for a current in one direction, and be in the ON-state for a current in the other direction, so that the passage of currents of both the directions is permitted.

In response to the switching operation of the switching element Q1, charging/discharging currents flow to and from the primary-side parallel resonant capacitor Cr during the periods when the switching element Q1 is in the OFF-state, due to the voltage resonant operation of the primary-side parallel resonant circuit. Furthermore, during the periods when the switching element Q1 is in the ON-state, the primary-side series resonant circuit implements resonant operation so that a resonant current flows through the path of the primary-side series resonant capacitor C11, the primary winding N1, and the switching element Q1.

The expression that the resonant frequency is "dominated" in the second embodiment indicates that the resonant frequency value of the primary-side series resonant circuit greatly depends on the inductance value of the leakage inductor L1 arising in the primary winding N1 and the capacitance value of the primary-side series resonant capacitor C11, and the resonant frequency value of the primary-side parallel resonant circuit greatly depends on the inductance value of the leakage inductor L1 and the capacitance value of the primary-side parallel resonant capacitor Cr. The expression also indicates that influence of other components on the respective resonant frequencies is comparatively small. Strictly speaking, these resonant frequencies have a relation to the ratio between the capacitance values of the primary-side parallel resonant capacitor Cr and the primary-side series resonant capacitor C11, the ratio between the capacitance values of the smoothing capacitor Ci and the primary-side series resonant capacitor C11, and the ratio between the inductance values between the inductor L10 and the leakage inductor L1. However, these ratios are not predominant, and hence the resonant frequencies are not dominated by these ratios.

A specific description will be made below on the primary-side parallel resonant frequency as an example. Specifically, as one example, not only the primary-side parallel resonant capacitor Cr and the leakage inductor L1 but also the capacitance value of the primary-side series resonant capacitor C11, which interconnects the primary-side parallel resonant capacitor Cr and the leakage inductor L1, has influence on the primary-side parallel resonant frequency. However, if the capacitance value of the primary-side series resonant capacitor C11 is greatly larger than that of the primary-side parallel resonant capacitor Cr, the contribution of the primary-side series resonant capacitor C11 to the primary-side parallel resonance is small, and it can be determined that the primary-side parallel resonant frequency is not dominated by the primary-side series resonant capacitor C11. As another example, the connecting of the series circuit of the inductor L10 and the smoothing capacitor Ci in parallel to the leakage inductor L1 has influence on the primary-side parallel resonant frequency. In general, the capacitance value of the smoothing capacitor Ci is greatly larger than that of the primary-side parallel resonant capacitor Cr, and therefore the smoothing capacitor Ci can be regarded as being short-circuited in terms of the AC transmission. However, if the inductance value of the inductor L10 is significantly larger than that of the leakage inductor L1, the inductance value arising from the parallel connection of the inductor L10 to the leakage inductor L1 is defined substantially by the leakage inductor L1. Therefore, it can be determined that the primary-side parallel resonant frequency is not dominated by the series circuit of the inductor L10 and the smoothing capacitor Ci. It should be noted that stray capacitance components and inductance components arising in parts and interconnects are included in the primary-side parallel resonant capacitor Cr, the primary-side series resonant capacitor C11, the leakage inductor L1, and the inductor L10.

In the above-described circuit configuration, the isolation converter transformer auxiliary winding Ng is connected to the primary winding N1 so that the voltage generated in the winding Ng has such polarities that the auxiliary switch element Q2 is in the ON- (conducting-) state when the switching element Q1 is in the OFF- (non-conducting-) state. Varying the ratio between the resistance values of the resistors Rg1 and Rg2 allows adjustment of the length of the time period when the auxiliary switch element Q2 is in the ON- (conducting-) state.

On the secondary side, the isolation converter transformer PIT includes the secondary winding N2. Since the coupling degree in the isolation converter transformer is set to loose coupling, the secondary winding N2 has a leakage inductor L2 similarly to the primary winding N1. Furthermore, a secondary-side series resonant circuit of which resonant frequency is dominated by the leakage inductor L2 arising in the secondary winding N2 of the isolation converter transformer PIT and the secondary-side series resonant capacitor C4.

The formation of the secondary-side series resonant circuit can narrow the variation range $\Delta fs$ of the switching frequency fs for the above-described constant-voltage control of the switching power supply circuit.

The secondary-side series resonant circuit is connected in series to the secondary-side rectifying and smoothing circuit. The secondary-side rectifying and smoothing circuit includes a secondary-side rectifier element and a secondary-side smoothing capacitor. The secondary-side rectifier element is formed of a bridge connection circuit that includes rectifier diodes Do1 to Do4 in bridge connection and has the input side and output side. The connecting node between the rectifier diodes Do1 and Do2 and the connecting node between the rectifier diodes Do3 and Do4 are defined as the input side. The connecting node between the rectifier diodes Do1 and Do3 and the connecting node between the rectifier diodes Do2 and Do4 are defined as the output side. A smoothing capacitor Co is connected to the output side of the bridge connection circuit. This secondary-side rectifying and smoothing circuit is a full-wave rectifier circuit that rectifies both the positive and negative voltages generated in the secondary winding N2 and uses the rectified voltage as load power.

More detailed features of the switching power supply circuit shown in FIG. 12 will be described below. A structural example of the isolation converter transformer PIT included in the power supply circuit of FIG. 12 with the above-described configuration is the same as that shown in FIG. 5, and hence the description therefor will be omitted.

The choke coil PCC can also be constructed by providing a winding around an EE-shaped core with predetermined shape and size. In the present embodiment, ER-28 is used as the core member, the length of the gap G is set to 0.8 mm, and the number of turns of the choke coil winding N10 is set to 50 T. Thus, 1 mH (millihenry) is obtained as the inductance value of the inductor L10.

The parameters of major parts in the power supply circuit of FIG. 12 were chosen as follows, so that experimental results to be described later on this power supply circuit were obtained.

The capacitances of the primary-side parallel resonant capacitor Cr, the primary-side series resonant capacitor C11, the clamp capacitor C3, and the secondary-side series resonant capacitor C4 were chosen as follows:

Cr=1000 pF
C11=0.018 μF
C3=0.1 μF
C4=0.056 μF

The resistance values of the resistors Rg1 and Rg2 were chosen as follows:

Rg1=120Ω (ohm)
Rg2=100Ω

The allowable load power range was from the maximum load power Pomax of 300 W to the minimum load power Pomin of 0 W (no load). The rated level of the DC output voltage Eo was 175 V.

The experimental results on the power supply circuit of FIG. 12, regarding the waveforms of the respective currents and voltages, are substantially the same as those indicated by the waveform diagrams of FIGS. 6A and 6B, and hence the description therefor will be omitted.

Figure 13:
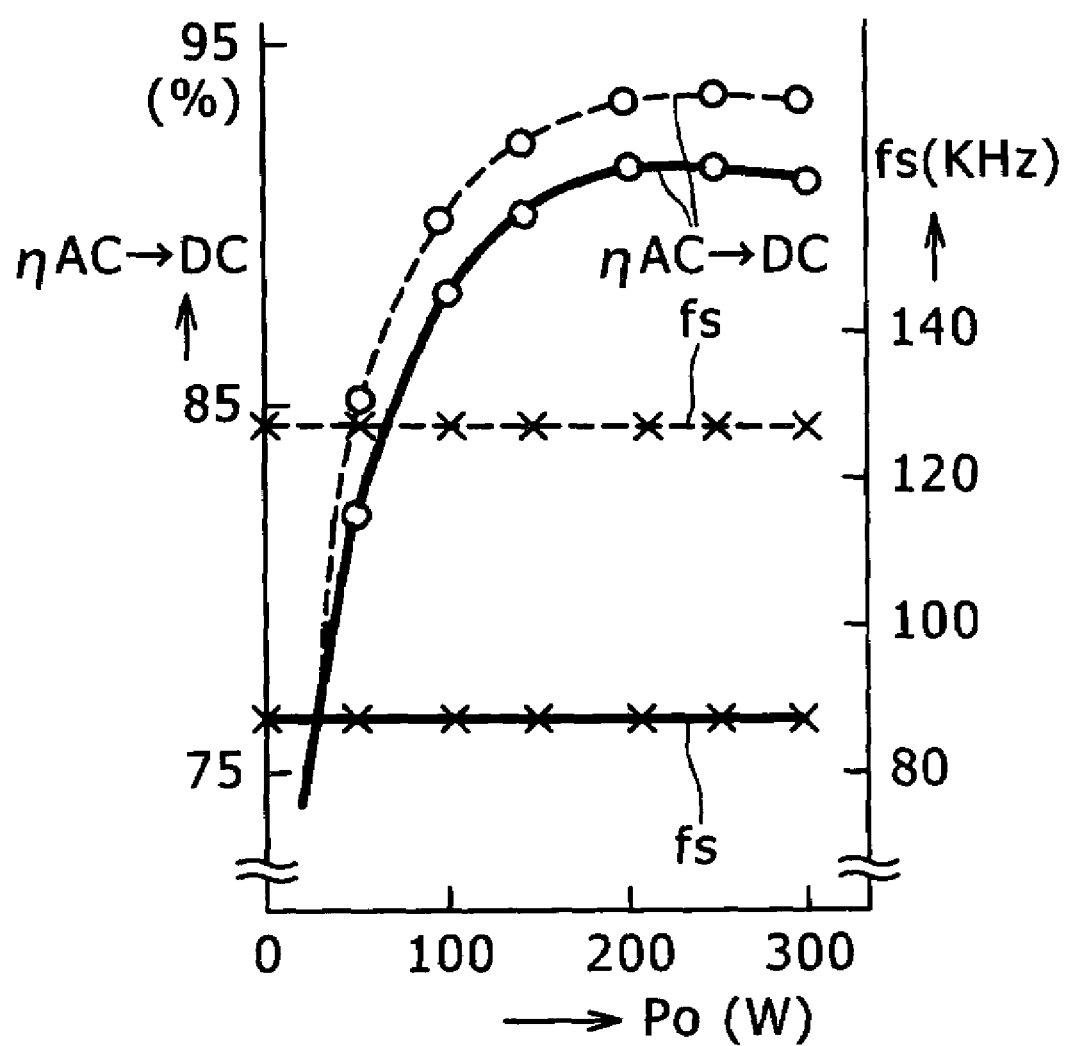
FIG. 13 is a diagram showing, as functions of the load, the variation characteristics of the AC to DC power conversion efficiency and switching frequency of the power supply circuit as the second embodiment.

The characteristics of the power supply circuit of the second embodiment shown in FIG. 12 will be described with reference to FIG. 13. FIG. 13 shows the AC to DC power conversion efficiency ($\eta AC \rightarrow DC$) and the switching frequencies fs of the modified class-E switching operation multiple resonant converter of the second embodiment in the load power range from 0 W to 300 W when the input AC voltage VAC is 100 V, and when the voltage VAC is 230 V. The full line in FIG. 13 indicates the characteristics when the input AC voltage VAC is 100 V, while the dashed line indicates those when the voltage VAC is 230 V.

The characteristics of the AC to DC power conversion efficiency ($\eta AC \rightarrow DC$) and the switching frequency fs of the class-E switching operation multiple resonant converter of the second embodiment in the range of the input AC voltage VAC from 85 V to 230 V when the load power is 300 W are similar to those shown in FIG. 8, and hence the description therefor will be omitted.

Referring to FIG. 13, when the input AC voltage VAC was 100 V, significantly favorable results were obtained as follows: the AC to DC power conversion efficiency reached 91.4%; and the range of the switching frequency fs was from 86.2 kHz to 86.5 kHz, and hence the width of the variable range $\Delta fs$ of the switching frequency fs was 0.3 kHz. Furthermore, the results when the input AC voltage VAC was 230 V were as follows: the AC to DC power conversion efficiency reached 93.8%; and the switching frequency fs was invariably 128.2 kHz, and hence the width of the variable range $\Delta fs$ of the switching frequency fs was 0 kHz. Both when the input AC voltage VAC is 100 V and when it is 230 V, the width of the variable range $\Delta fs$ of the switching frequency fs is drastically smaller than that in the circuit shown in FIG. 16 as a background art. The reason for this is that the primary-side series resonant circuit, primary-side parallel resonant circuit and secondary-side series resonant circuit are provided, and the isolation converter transformer auxiliary winding Ng is provided in the isolation converter transformer PIT. More specifically, the provision of these circuits and the winding Ng allows the time ratio between the ON periods of the switching element Q1 and the auxiliary switch element Q2 (the ratio of the period TON to the period TOFF) to be changed in response to variation in the load power and the input AC voltage VAC, which can narrow the variable range Δfs.

(Modifications of Secondary-Side Circuit)

Figure 14:
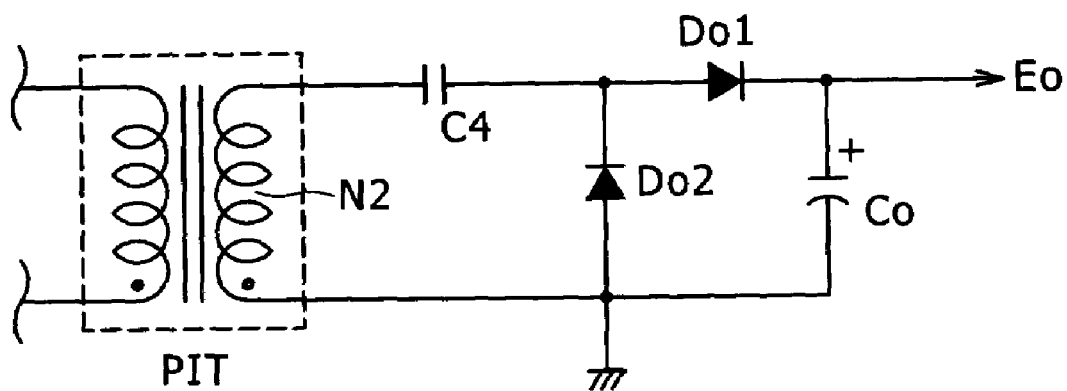
FIG. 14 is a diagram illustrating a modification of a secondary-side circuit of the second embodiment.
Figure 15:
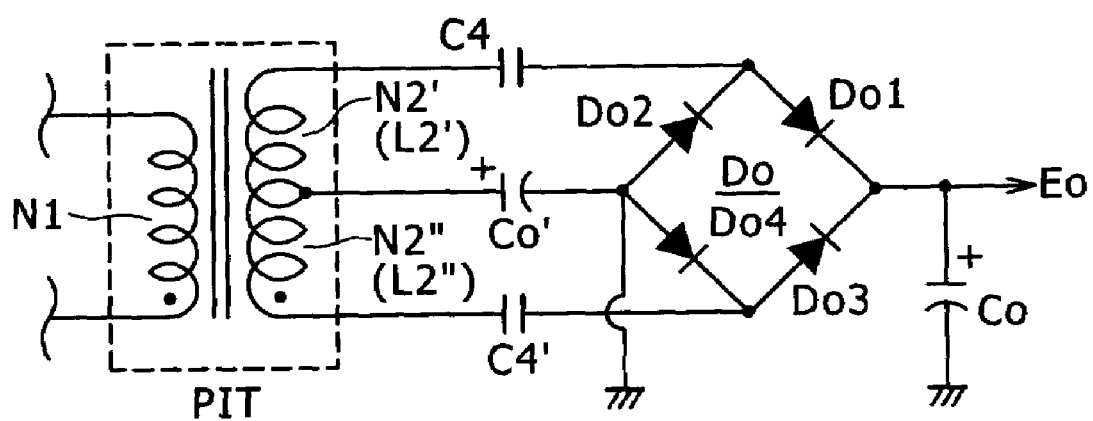
FIG. 15 is a diagram illustrating another modification of the secondary-side circuit of the second embodiment.

FIGS. 14 and 15 illustrate modifications of the secondary-side circuit that can be applied to both the first and second embodiments. Although the isolation converter transformer auxiliary winding Ng is provided in the isolation converter transformer PIT in the first and second embodiments, the illustration of the isolation converter transformer auxiliary winding Ng is omitted in FIGS. 14 and 15. The circuit shown in FIG. 14 is a voltage-doubler half-wave rectifier circuit, and offers an advantage of achieving a doubled rectified voltage. In the circuit, a secondary-side series resonant circuit is formed of a leakage inductor L2 of a secondary winding N2 and a secondary-side series resonant capacitor C4. The secondary-side rectifying and smoothing circuit is connected in series to the secondary-side series resonant circuit.

The secondary-side rectifier element is formed of a series connection circuit of two rectifier diodes Do1 and Do2 of which terminals of the opposite polarities are connected to each other. A secondary-side smoothing capacitor Co is connected to both the ends of the series connection circuit of the rectifier diodes Do1 and Do2. In this voltage-doubler half-wave rectifier circuit, in the periods of half cycles of one polarity of the voltage arising in the secondary winding N2, a current flows through the rectifier diode Do2, and thus a DC voltage is held by the secondary-side series resonant capacitor C4. In the periods of half cycles of the other polarity, a current flows through the rectifier diode Do1, and thus a voltage is generated across the secondary-side smoothing capacitor Co. At this time, the DC voltage held by the secondary-side series resonant capacitor C4 is added to the voltage across the secondary-side smoothing capacitor Co, so that the resultant voltage is output as a DC output voltage Eo.

The circuit shown in FIG. 15 is a voltage-doubler full-wave rectifier circuit. Specifically, the circuit of FIG. 15 includes a DC voltage holding capacitor Co', which is absent in the circuit of FIG. 14. If this DC voltage holding capacitor Co' is not included, the circuit shown in FIG. 15 is the same as that obtained by combining two voltage-doubler half-wave rectifier circuits in FIG. 16 with each other. Initially, a description will be made on the circuit obtained by eliminating the DC voltage holding capacitor Co' from the circuit of FIG. 15. Thereafter, a description will be made on the circuit of FIG. 15, including the DC voltage holding capacitor Co'. In the circuit of FIG. 15, the capacitance value of the DC voltage holding capacitor Co' is significantly larger than the capacitance values of a first secondary-side series resonant capacitor C4 and a second secondary-side series resonant capacitor C4'.

As secondary windings, a first secondary partial winding N2' and a second secondary partial winding N2" of which winding direction is the same as that of the first secondary partial winding N2' are formed with use of a center tap. Specifically, when the center tap is defined as a reference, the voltage arising at the winding end, opposite to the center tap side, of the first secondary partial winding N2' and the voltage arising at the winding end, opposite to the center tap side, of the second secondary partial winding N2" are in opposite phases.

Furthermore, a secondary-side series resonant circuit is formed of a first secondary-side series resonant circuit and a second secondary-side series resonant circuit. The resonant frequency of the first secondary-side series resonant circuit is dominated by a leakage inductor L2' arising in the first secondary partial winding N2' and the first secondary-side series resonant capacitor C4. The resonant frequency of the second secondary-side series resonant circuit is dominated by a leakage inductor L2' arising in the second secondary partial winding N2' and the second secondary-side series resonant capacitor C4'. The respective inductance values and capacitance values of the leakage inductor L2', the first secondary-side series resonant capacitor C4, the leakage inductor L2", and the second secondary-side series resonant capacitor C4' are set so that the first and second secondary-side series resonant circuits have substantially the same resonant frequency.

The secondary-side rectifying and smoothing circuit is formed of a first secondary-side rectifying and smoothing circuit and a second secondary-side rectifying and smoothing circuit. The first secondary-side rectifying and smoothing circuit includes rectifier diodes Do1 and Do2 that are a first secondary-side rectifier element connected in series to the first secondary-side series resonant circuit, and a secondary-side smoothing capacitor Co. The second secondary-side rectifying and smoothing circuit includes rectifier diodes Do3 and Do4 that are a second secondary-side rectifier element connected in series to the second secondary-side series resonant circuit, and the secondary-side smoothing capacitor Co. The secondary-side smoothing capacitor Co is connected to both the ends of the series connection circuit of the rectifier diodes Do1 and Do2, and to both the ends of the series connection circuit of the rectifier diodes Do3 and Do4. In this manner, a voltage-doubler full-wave rectifier circuit is constructed.

In the periods of half cycles of one polarity of the voltage arising in the secondary partial windings N2' and N2", a current flows through the rectifier diode Do2, and thus a DC voltage is held by the first secondary-side series resonant capacitor C4. In the periods of half cycles of the other polarity, a current flows through the rectifier diode Do1, and thus a voltage is generated across the secondary-side smoothing capacitor Co. At this time, the DC voltage held by the first secondary-side series resonant capacitor C4 is added to the voltage across the secondary-side smoothing capacitor Co, so that the resultant voltage is output as a DC output voltage Eo. Similarly, in the periods of half cycles of the other polarity, a current flows through the rectifier diode Do4, and thus a DC voltage is held by the second secondary-side series resonant capacitor C4'. In the periods of half cycles of the one polarity, a current flows through the rectifier diode Do3, and thus a voltage is generated across the secondary-side smoothing capacitor Co. At this time, the DC voltage held by the second secondary-side series resonant capacitor C4' is added to the voltage across the secondary-side smoothing capacitor Co, so that the resultant voltage is output as the DC output voltage Eo. In this manner, a doubled voltage is achieved, and the circuit of FIG. 15 operates as a voltage-doubler full-wave rectifier circuit in which the respective voltage-doubler rectifier circuits operate in the entire half cycles of both the polarities.

The above-described operation corresponds to the case in which the DC voltage holding capacitor Co' is not included. In contrast, if the DC voltage holding capacitor Co' is included, both of the voltage held by the first secondary-side series resonant capacitor C4 and the voltage held by the second secondary-side series resonant capacitor C4' are held also by the DC voltage holding capacitor Co', which eliminates the need for the first and second secondary-side series resonant capacitors C4 and C4' to hold the DC voltage. As a result, there is no need for the capacitors C4 and C4' to have a favorable DC characteristic, which facilitates the choice of the components. The reason why the first and second secondary-side series resonant capacitors C4 and C4' do not need to hold the DC voltage is as follows: the DC voltage is divided by the DC voltage holding capacitor Co' and the first secondary-side series resonant capacitor C4, or by the DC voltage holding capacitor Co' and the second secondary-side series resonant capacitor C4' depending on the respective capacitance values, and the capacitance value of the DC voltage holding capacitor Co' is significantly larger than the capacitance values of the first and second secondary-side series resonant capacitors C4 and C4'.

It should be noted that the present invention is not limited to the configurations shown as the above-described embodiments. For example, as the switching element (and the auxiliary switch element), e.g. an insulated gate bipolar transistor (IGBT) or a bipolar transistor may be used instead of a MOSFET. Moreover, although the above-described embodiments employ a separately-excited switching converter, the present invention can be applied also to a configuration employing a self-excited switching converter.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply circuit comprising:
    a switching element that implements switching for a direct-current (DC) voltage to convert the DC voltage into an alternating-current (AC) voltage;
    a converter transformer that includes a primary winding and a secondary winding, the AC voltage arising from conversion by the switching element being input to the primary winding so that an AC voltage is generated in the secondary winding;
    a secondary-side rectifying and smoothing circuit that includes a secondary-side rectifier element and a secondary-side smoothing capacitor for rectifying and smoothing the AC voltage generated in the secondary winding to produce an output DC voltage;
    a switching element control unit that controls the switching element based on the output DC voltage;
    a choke coil that is supplied with the DC voltage through one end, and is connected via the other end to one winding end of the primary winding in the converter transformer and one terminal of the switching element;
    a primary-side series resonant circuit that is formed by connecting a primary-side series resonant capacitor between the other winding end of the primary winding in the converter transformer and the other terminal of the switching element, and has a resonant frequency dominated by a leakage inductance arising in the primary winding in the converter transformer and the primary-side series resonant capacitor;
    a primary-side parallel resonant circuit that is formed by connecting a primary-side parallel resonant capacitor in parallel to the switching element, and has a resonant frequency dominated by the leakage inductance arising in the primary winding and the primary-side parallel resonant capacitor; and
    a series circuit that is formed of a clamp capacitor and an auxiliary switch element, and is connected in parallel to the choke coil,
    wherein the auxiliary switch element is controlled so as to conduct in a non-conducting period of the switching element.

2. The switching power supply circuit according to claim 1, wherein
    switching on and off of the auxiliary switch element is controlled by a converter transformer auxiliary winding wound around the converter transformer.

3. The switching power supply circuit according to claim 1, wherein
    switching on and off of the auxiliary switch element is controlled by a chock coil auxiliary winding wound around the chock coil.

4. The switching power supply circuit according to claim 1, further comprising
    a partial resonant capacitor that is connected in parallel to a leakage inductance arising in the secondary winding in the converter transformer and the secondary winding.

5. The switching power supply circuit according to claim 1, further comprising
    a secondary-side series resonant circuit that has a resonant frequency dominated by a leakage inductance arising in the secondary winding in the converter transformer and a secondary-side series resonant capacitor connected in series to the secondary winding.

6. The switching power supply circuit according to claim 1, wherein
    the secondary-side rectifier element is formed of a bridge connection circuit of rectifier diodes having an input side and an output side, and serves as a full-wave rectifier circuit, and
    the secondary-side smoothing capacitor is connected to the output side of the bridge connection circuit of the rectifier diodes.

7. The switching power supply circuit according to claim 1, wherein
    the secondary-side rectifier element is formed of a series connection circuit of two rectifier diodes of which terminals of opposite polarities are connected to each other, and
    the secondary-side smoothing capacitor is connected to both ends of the series connection circuit of the two rectifier diodes so that a voltage-doubler half-wave rectifier circuit is formed.

8. The switching power supply circuit according to claim 1, wherein
    the secondary-side rectifying and smoothing circuit is a full-wave rectifier circuit that includes a center tap provided for the secondary winding in the converter transformer.

9. The switching power supply circuit according to claim 1, further comprising
    a primary-side rectifying and smoothing circuit that includes a primary-side rectifier element and a primary-side smoothing capacitor for producing a rectified and smoothed voltage resulting from rectifying and smoothing of AC power, the DC voltage being supplied from the primary-side rectifying and smoothing circuit.

* * * * *